(12) United States Patent
Costa

(10) Patent No.: US 11,351,809 B2
(45) Date of Patent: Jun. 7, 2022

(54) IDENTIFICATION AUTHENTICATION SECURITY METHOD AND APPARATUS FOR ENCODING DATA ON AN ARTICLE

(71) Applicant: Larry J. Costa, Mooresville, NC (US)

(72) Inventor: Larry J. Costa, Mooresville, NC (US)

( * ) Notice: Subject to any disclaimer, the term of this patent is extended or adjusted under 35 U.S.C. 154(b) by 0 days.

(21) Appl. No.: 16/986,834

(22) Filed: Aug. 6, 2020

(65) Prior Publication Data
US 2021/0039420 A1 Feb. 11, 2021

Related U.S. Application Data

(60) Provisional application No. 62/883,381, filed on Aug. 6, 2019.

(51) Int. Cl.
| | |
|---|---|
| *B42D 25/337* | (2014.01) |
| *B42D 25/47* | (2014.01) |
| *G06K 7/14* | (2006.01) |
| *B42D 25/324* | (2014.01) |
| *G06K 19/06* | (2006.01) |
| *B42D 25/44* | (2014.01) |

(52) U.S. Cl.
CPC .......... *B42D 25/337* (2014.10); *B42D 25/47* (2014.10); *G06K 7/1417* (2013.01); *G06K 7/1421* (2013.01)

(58) Field of Classification Search
CPC .... B42D 25/337; B42D 25/47; G06K 7/1417; G06K 7/1421; G06K 7/14
USPC ....... 283/67, 70, 72, 73, 74, 93, 94, 98, 901
See application file for complete search history.

(56) References Cited

U.S. PATENT DOCUMENTS

| | | | | |
|---|---|---|---|---|
| 5,395,181 | A | * | 3/1995 | Dezse .................. B41J 3/01 235/432 |
| 7,089,420 | B1 | * | 8/2006 | Durst .................. G09C 5/00 713/176 |
| 9,573,181 | B2 | | 2/2017 | Costa |
| 9,930,230 | B2 | | 3/2018 | Costa |
| 9,931,681 | B2 | | 4/2018 | Costa |
| 10,095,091 | B2 | | 10/2018 | Costa |
| 10,335,842 | B2 | | 7/2019 | Costa |
| 10,618,093 | B2 | | 4/2020 | Costa |
| 10,702,903 | B2 | | 7/2020 | Costa |
| 2004/0060993 | A1 | * | 4/2004 | Walmsley .......... G06K 19/06 235/494 |
| 2005/0241203 | A1 | * | 11/2005 | Lizotte .............. F41A 21/12 42/1.01 |
| 2006/0011725 | A1 | * | 1/2006 | Schnee ............ G06K 7/10861 235/454 |
| 2018/0243810 | A1 | | 8/2018 | Costa |

\* cited by examiner

*Primary Examiner* — Justin V Lewis
(74) *Attorney, Agent, or Firm* — Perkins Coie LLP

(57) ABSTRACT

A method for authenticating an article including engraving a circular feature into a verification substrate that includes a plurality of concentric rings within the circular feature arranged in a pattern according to a data encoding schema, wherein at least one of the plurality of rings includes a surface anomaly. The method can include capturing a first image of the circular feature and storing the first image in a memory device. The verification substrate can be attached to an article to traced and/or authenticated. A second image of the circular feature can be captured and compared with the first image to determine if the surface anomaly is present in the second image, thereby authenticating the article.

18 Claims, 23 Drawing Sheets

TABLE A

| 36 Marking Locations at 10 Deg. Increments | Encoded Lands Rings' Cutting Mark and Utilizing Up to 4 Spots' Markings Combinations | Variable Digital Data for the 8 Bit Binary Encoded Lands' having a Single Rotating Edge Markings and Spots | | | | | | | |
|---|---|---|---|---|---|---|---|---|---|
| | | Binary for Digits 0 through 255 | | | | Utilizing up to 4 Spots Variable Digital Data | | | |
| | | Maximum Pass/Key | Digits | Data Bits | Data KB | Maximum Pass/Key | Digits | Data Bits | Data KB |
| Single Cutting Land = 1 Mark | 36 | | | | | | | | |
| With 1 Spot Data Element | | 9.22E+03 | 4 | 14 | 0.0018 | 3.32E+05 | 6 | 19 | 0.0024 |
| With 2 Spot Data Elements | | | | | | 3.32E+10 | 11 | 35 | 0.0044 |
| With 3 Spot Data Elements | | | | | | 3.32E+15 | 16 | 52 | 0.0065 |
| With 4 Spot Data Elements | | | | | | 3.32E+20 | 21 | 69 | 0.0086 |
| 2D QR Code (Ver.2) Inner Position Detection Patterns | | | | | | | | | |
| Single Cutting Land = 1 Mark | At 3 Positions = | 9.22E+09 | 10 | 42 | 0.0053 | | | | |
| With 4th Spot Data Element | | | | | | 3.32E+60 | 61 | 207 | 0.0259 |
| 2D Data Matrix Code 10x10 Alignment Patterns | | | | | | | | | |
| Single Cutting Land = 1 Mark | At 19 Positions = | 9.22E+57 | 58 | 266 | 0.0333 | | | | |
| With 4th Spot Data Element | | | | | | 3.32E+380 | 381 | 1,311 | 0.1639 |
| 2D Data Matrix Code 10x10 Alignment Patterns + Code Word Individual Data Elements | | | | | | | | | |
| Single Cutting Land = 1 Mark | At 61 Positions = | 9.22E+183 | 184 | 854 | 0.1068 | | | | |
| With 4th Spot Data Element | | | | | | 3.32E+1,220 | 1,221 | 4,209 | 0.5261 |
| 2D QR Code (Ver.2) Inner and Outer Position Detection Patterns + Code Word Individual Data Elements | | | | | | | | | |
| Single Cutting Land = 1 Mark | At 156 Positions = | 9.22E+468 | 469 | 2,184 | 0.2730 | | | | |
| With 4th Spot Data Element | | | | | | 3.32E+3,120 | 3,121 | 10,764 | 1.3455 |

FIGURE 11

| TABLE E<br>36 Marking Locations at<br>10 Deg. Increments | Encoded Land Rings'<br>All 4 Marks the Same<br>4 Mark Combinations | Total Digits for the I2of5 having 4 of the Same Markings | | | | | | |
|---|---|---|---|---|---|---|---|---|
| | | I2of5 for 2 Digits 00 through 99 | | | | I2of5 for 4 Digits 0000 through 9999 | | |
| | | Maximum Pass/Key | Digits | Data Bits | Data KB | Maximum Pass/Key | Digits | Data Bits | Data KB |
| 1st Marked Ring | 58,905 | 5.03E+48 | 49 | 162 | 0.02 | 5.03E+50 | 51 | 169 | 0.02 |
| With 2nd Marked Ring | | 2.53E+97 | 98 | 324 | 0.04 | 2.53E+99 | 100 | 331 | 0.04 |
| With 3rd Marked Ring | | 1.27E+146 | 147 | 486 | 0.06 | 1.27E+148 | 149 | 492 | 0.06 |
| 2D QR Code (Ver.2) Position Detection Patterns | | | | | | | | | |
| With 2nd Marked Ring | At 3 Positions = | 2.53E+291 | 297 | 969 | 0.12 | 2.53E+297 | 298 | 988 | 0.12 |
| With 3rd Marked Ring | | 1.27E+438 | 439 | 1,458 | 0.18 | 1.27E+444 | 445 | 1,476 | 0.18 |
| 2D Data Matrix Code 10x10 Alignment Patterns | | | | | | | | | |
| With 2nd Marked Ring | At 19 Positions = | 2.53E+1,843 | 1,844 | 6,136 | 0.77 | 2.53E+1,881 | 1,540 | 6,289 | 0.79 |
| With 3rd Marked Ring | | 1.27E+2,774 | 2,775 | 9,234 | 1.15 | 1.27E+2,812 | 2,813 | 9,348 | 1.17 |
| 2D Data Matrix Code 10x10 Code Word | | | | | | | | | |
| With 2nd Marked Ring | At 61 Positions = | 2.53E+5,917 | 4,918 | 19,764 | 2.47 | 2.53E+6,039 | 6,040 | 20,191 | 2.52 |
| With 3rd Marked Ring | | 1.27E+8,907 | 8,908 | 29,646 | 3.71 | 1.27E+9,028 | 9,029 | 30,012 | 3.75 |

Figure 22

IDENTIFICATION AUTHENTICATION SECURITY METHOD AND APPARATUS FOR ENCODING DATA ON AN ARTICLE

CROSS-REFERENCE TO RELATED APPLICATION

This application claims the benefit of and priority to U.S. Provisional Patent Application No. 62/883,381, filed Aug. 6, 2019, the disclosure of which is incorporated herein by reference in its entirety.

TECHNICAL FIELD

This patent application is directed to methods for product authentication, and more specifically, to methods for providing anti-counterfeiting authentication of products, credentials, and financial instruments.

BACKGROUND

The counterfeiting of products, credentials, and financial instruments, for example, is a worldwide problem having escalating health, economic, national security, and geopolitical consequences. The integrity and security of an article is dependent on its unique identification at the article's point-of-use as the use of counterfeits can have extensive, expensive, and/or unresolvable consequences.

Counterfeit resistant and counterfeit detectable identification for identifying and tracing an article throughout its manufacturing processes, distribution, and product life cycle has become a necessity as it is being required by the increasingly competitive global manufacturing and distribution environment. An article's secure unique identification is frequently required by manufacturers' quality plans, industrial standards organizations, governmental regulatory agencies, and customers' specifications, for example. More specifically, secure unique identification is frequently required for patient prescriptions, patient specific biological replacement(s), critical part design revision identification, a product's unique assembly of multiple parts having a combined tolerance stack-up, certificate of origin, Department of Defense traceable components, data/communication systems, product recalls, an article's forensic identification, identification traceability/authorization required for a specific transaction, location identification, personal identification, device identification, access control means, etc.

In some cases, the delivery of a first article is accepted as the authentic critical article, even if it is a counterfeit. The undetected counterfeit article can then be used by the recipient as intended, thereby exposing its user to the risks and consequences of relying on the counterfeit article. The subsequent delivery of the actual authentic critical article can be incorrectly identified as a counterfeit copy. In some instances, the suspected counterfeit article is returned to the article's provider or regulatory and/or law enforcement agency for an investigative analysis to determine its authenticity. Meanwhile, the trust and credibility of the article's provider is immediately damaged.

Multiple technologies are readily available to capture and replicate an article's unique identification to facilitate counterfeiting. Continuous technological advancements are improving these technologies such that counterfeiters can cost effectively capture and replicate an article and counterfeit it's unique serialized numbering for the article's unique identification. Accordingly, there is a need for improved methods and devices for providing anti-counterfeiting authentication.

BRIEF DESCRIPTION OF THE DRAWINGS

The identification authentication security methods and apparatus for encoding data on an article described herein may be better understood by referring to the following Detailed Description in conjunction with the accompanying drawings, in which like reference numerals indicate identical or functionally similar elements:

FIG. 11 is a table illustrating variable digital data for an 8 bit binary encoded ring pattern having single or dual edge lines and surface anomalies according to embodiments of the disclosed technology;

FIG. 22 is a table illustrating codeword data values for different bar code types and various combinations of data elements according to embodiments of the disclosed technology.

Figure 1:
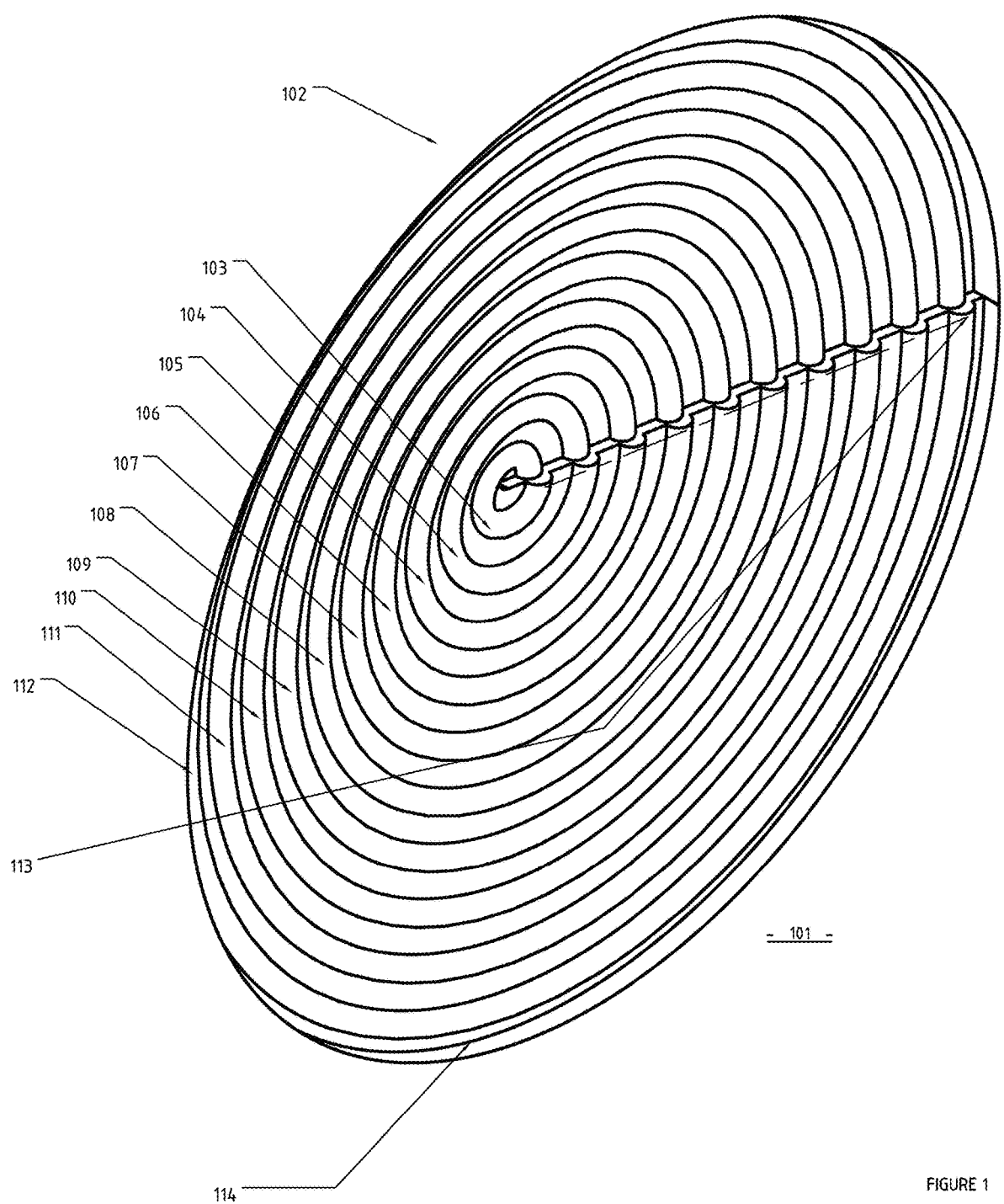
FIG. 1 is an isometric view of a three-dimensional circular ring pattern with cutting edge line according to an embodiment of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

SUMMARY

The disclosed technology includes systems and methods for authenticating an article. A method for authenticating and article in accordance with embodiments of the disclosed technology can comprise engraving a circular feature into a verification substrate including a plurality of concentric rings within the circular feature arranged in a pattern according to a data encoding schema, wherein at least one of the plurality of rings includes a surface anomaly. The method can include capturing a first image of the circular feature and storing the first image in a memory device. The verification substrate can be attached to an article. A second image of the circular feature can be captured and compared with the first image to determine if the surface anomaly is present in the second image, thereby authenticating the article. In some embodiments, the circular feature is concave. In some embodiments, the data encoding schema is code 39. In some embodiments, the method further comprises engraving at least one radial feature into a corresponding one of the plurality of rings. In some embodiments, the substrate comprises acrylic.

A method for authenticating and article in accordance with embodiments of the disclosed technology can comprise engraving a circular feature into a verification substrate including a plurality of concentric rings within the circular feature arranged in a pattern according to a data encoding schema, wherein at least one of the plurality of rings includes a surface anomaly. The method can include capturing a first image of the circular feature and storing the first image in a memory device. A barcode can be printed on the verification substrate and associated with the first image in the memory device. The verification substrate can be attached to an article. A second image of the circular feature can be captured and compared with the first image to determine if the surface anomaly is present in the second image, thereby authenticating the article. In some embodiments, the circular feature is concave. In some embodiments, the data encoding schema is code 39. In some embodiments, the method further comprises engraving at least one radial feature into a corresponding one of the plurality of rings. In some embodiments, the substrate comprises acrylic. In some embodiments, the barcode is a quick response (QR) code and the circular feature is a pattern locator for the barcode.

A system for authenticating an article in accordance with embodiments of the disclosed technology can comprise a verification substrate, including a circular feature having a plurality of concentric rings within the circular feature arranged in a pattern according to a data encoding schema, wherein at least one of the plurality of rings includes a surface anomaly, and an adhesive disposed on the verification substrate for attaching the verification substrate to an article. The system can include a camera configured to capture a first image of the circular feature and a database for receiving and storing the first image and associating a barcode printed on the substrate with the first image. A processor is programed to receive a second image of the circular feature and compare the second image with the first image to determine if the surface anomaly is present in the second image, thereby authenticating the article. In some embodiments, the circular feature is concave. In some embodiments, the system further comprises engraving at least one radial feature into a corresponding one of the plurality of rings. In some embodiments, the data encoding schema is code 39. In some embodiments, the substrate comprises acrylic. In some embodiments, the barcode is a quick response code and the circular feature is a pattern locator for the barcode.

DETAILED DESCRIPTION

Various examples of the methods and articles introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 2:
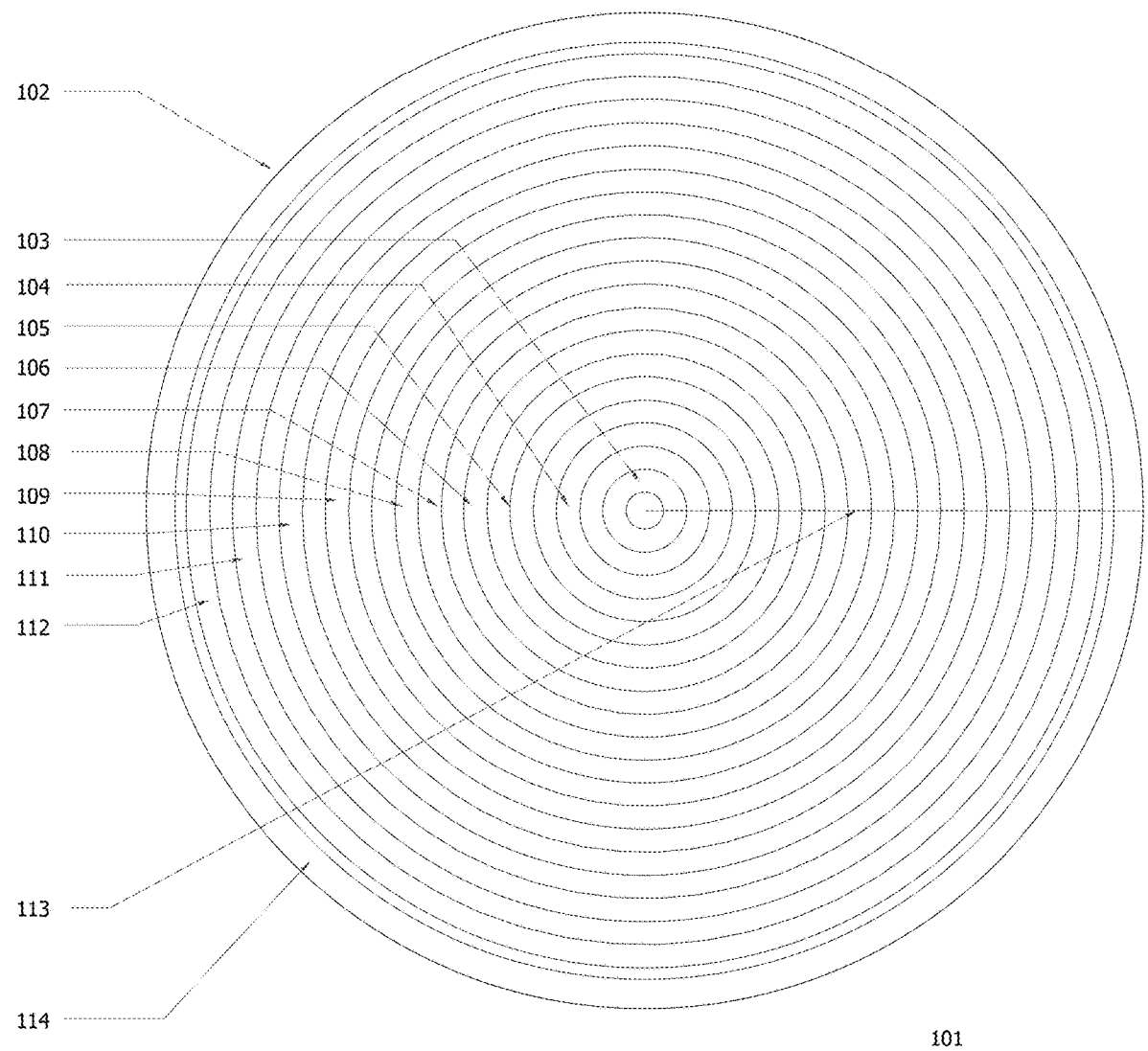
FIG. 2 is a plan view of the ring pattern shown in FIG. 1.

FIGS. 1 and 2 illustrate a three-dimensional circular ring pattern 101 including a two-dimensional (2D) bar code 102 and a cutting edge line 113, according to an embodiment of the disclosed technology. The 2D bar code pattern 102 includes an outer periphery 112 corresponding to a 1st encoded land data bracket and an inner periphery 103 corresponding to the 10th encoded land data bracket. The 2nd encoded land 111 corresponds to a 1st binary value=1; the 3rd encoded land 110 corresponds to a 2nd binary value=2; the 4th encoded land 109 corresponds to a 3rd binary value=4; the 5th encoded land 108 corresponds to a 4th binary value=8; the 6th encoded land 107 corresponds to a 5th binary value=16; the 7th encoded land 106 corresponds to a 6th binary value=32; the 8th encoded land 105 corresponds to a 7th binary value=64; and the 9th encoded land 104 corresponds to an 8th binary value=128.

Ring pattern 101 represents a value of 255 as all eight of the possible rings are present. The cutting edge line 113 from the center at the 90 angle, for either the a) clockwise stylus rotation stop or b) counter clockwise stylus rotation indention provide additional encoding options (e.g., FIG. 11). Some embodiments can include an optional outer periphery boundary ring 114.

Figure 3:
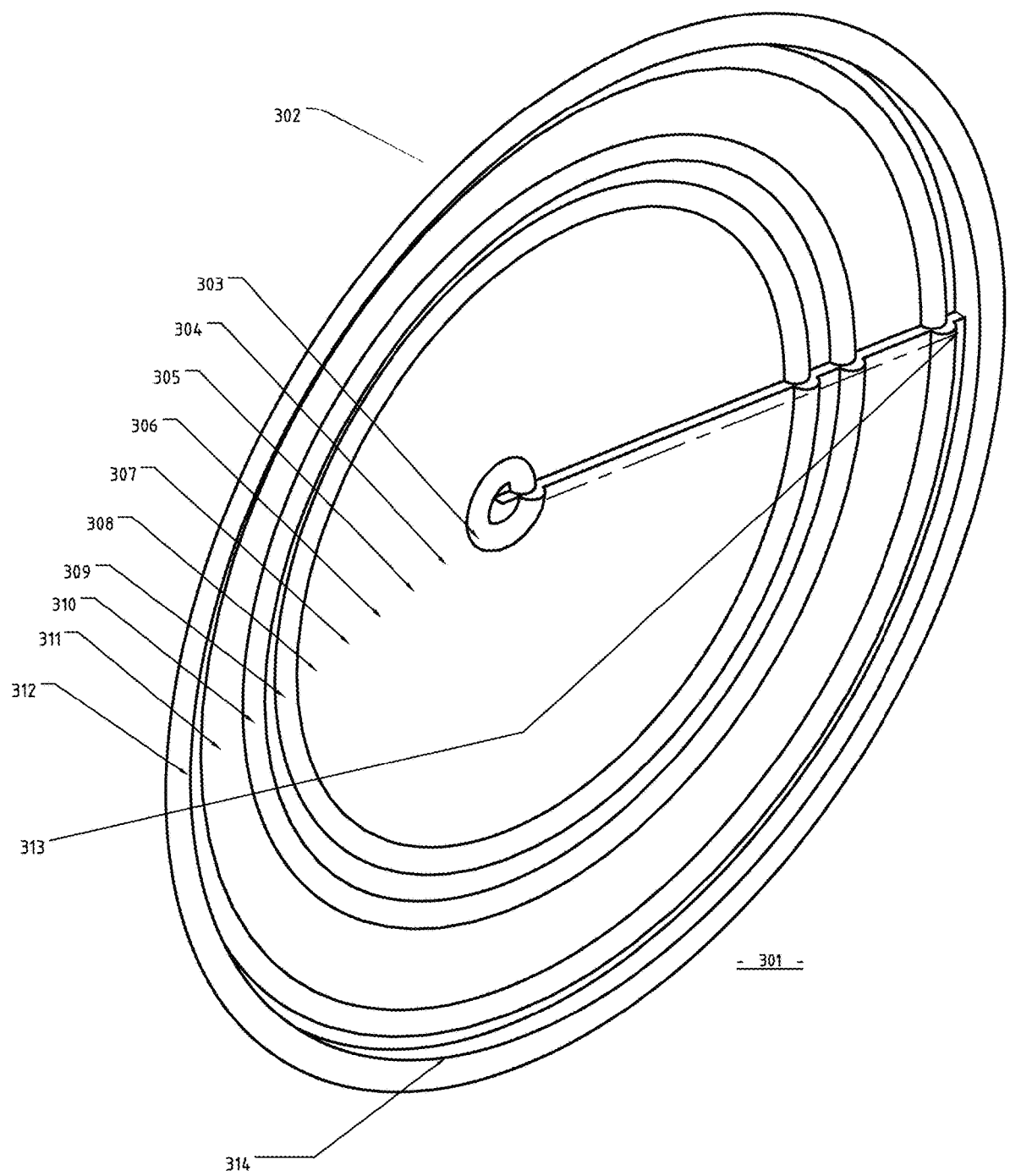
FIG. 3 is an isometric view of a three-dimensional circular ring pattern with cutting edge line according to another embodiment of the disclosed technology.
Figure 4:
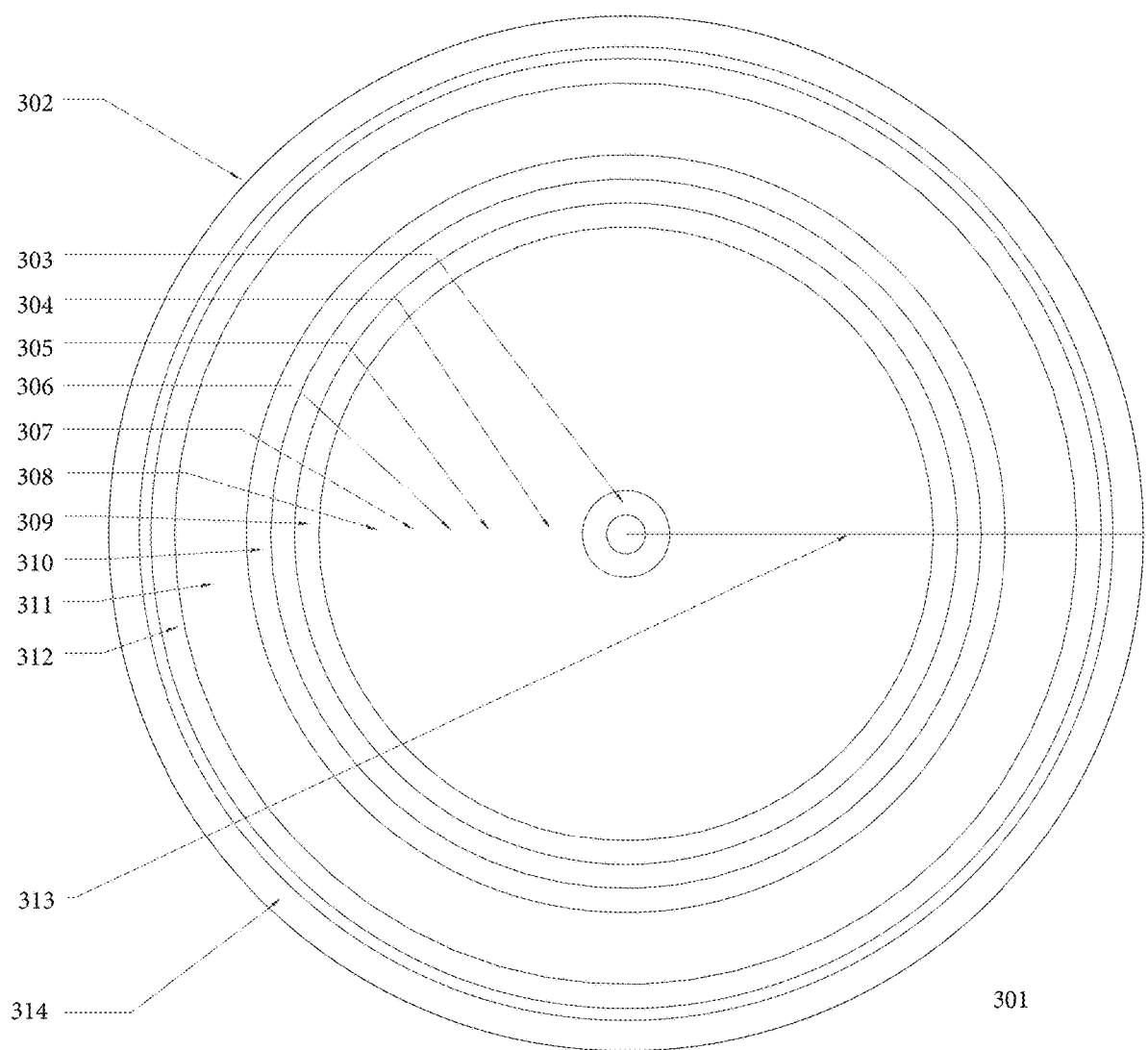
FIG. 4 is a plan view of the ring pattern shown in FIG. 3.

FIGS. 3 and 4 illustrate a three-dimensional circular ring pattern 301 including a two-dimensional (2D) bar code 302 and a cutting edge line 313, according to an embodiment of the disclosed technology. The 2D bar code pattern 302 includes an outer periphery 312 corresponding to a 1st encoded land data bracket and an inner periphery 303 corresponding to the 10th encoded land data bracket. The 2nd encoded land 311 (not present) corresponds to a 1st binary value=1; the 3rd encoded land 310 corresponds to a 2nd binary value=2; the 4th encoded land 309 corresponds to a 3rd binary value=4; the 5th encoded land 308 (not present) corresponds to a 4th binary value=8; the 6th encoded land 307 (not present) corresponds to a 5th binary value=16; the 7th encoded land 306 (not present) corresponds to a 6th binary value=32; the 8th encoded land 305 (not present) corresponds to a 7th binary value=64; and the 9th encoded land 304 (not present) corresponds to an 8th binary value=128.

Ring pattern 301 represents a value of 6 as only the 2nd and 3rd binary values (310/309) are present. The cutting edge line 313 extends from the center at a 90 degree angle, for either the a) clockwise stylus rotation stop or b) counter clockwise stylus rotation indention provide additional encoding options (e.g., FIG. 11). Some embodiments can include an optional outer periphery boundary ring 314.

Figure 5:
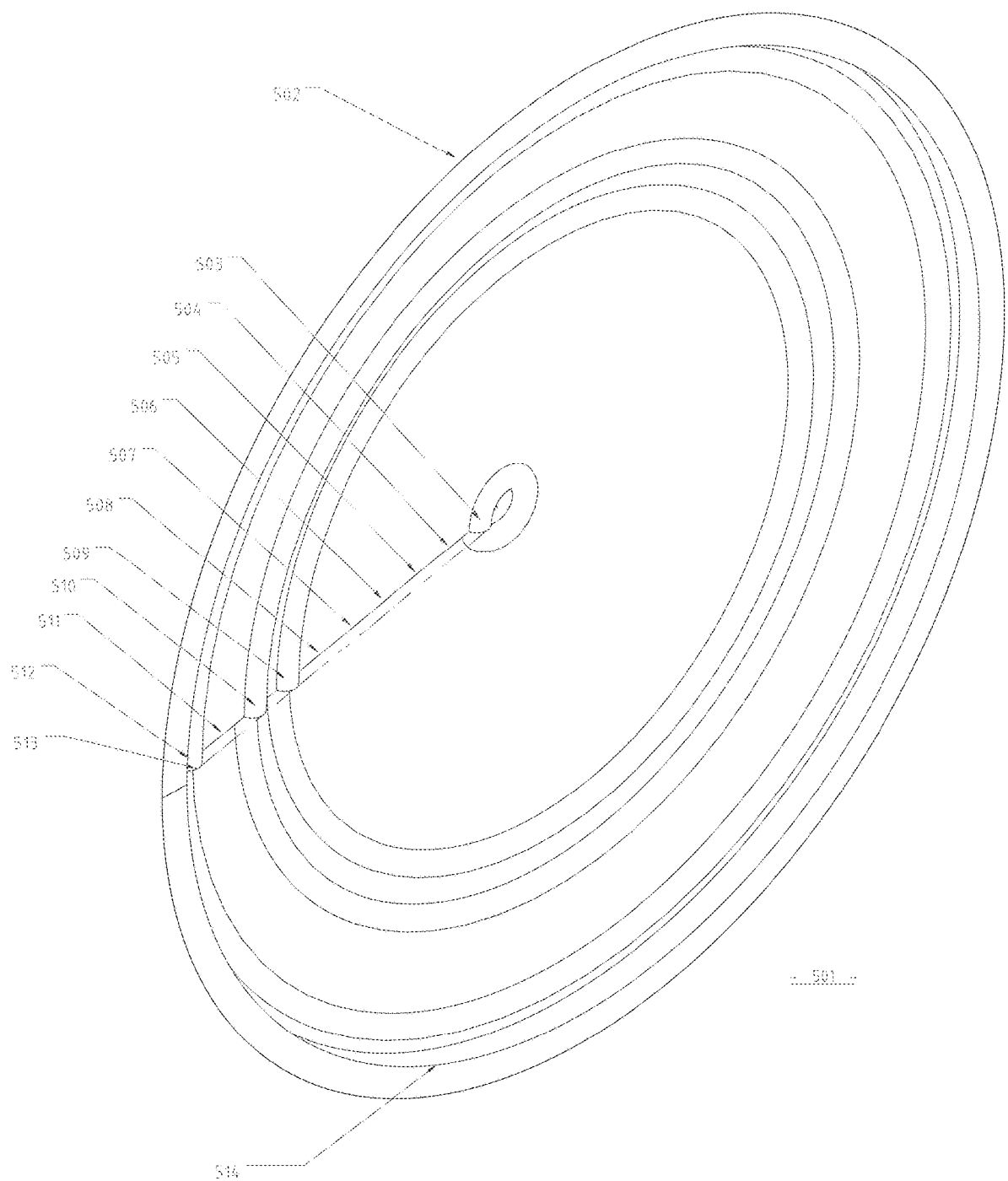
FIG. 5 is an isometric view of a three-dimensional circular ring pattern with cutting edge line according to yet another embodiment of the disclosed technology.

FIG. 5 illustrates a three-dimensional circular ring pattern 501 representing a value of 6 that is similar to ring pattern 301 discussed above with respect to FIGS. 3 and 4; however, the cutting edge line 513 extends from the center at a 270 degree angle. The 2D bar code pattern 502 includes an outer periphery 512 corresponding to a 1st encoded land data bracket and an inner periphery 503 corresponding to the 10th encoded land data bracket. The 2nd encoded land 511 (not present) corresponds to a 1st binary value=1; the 3rd encoded land 510 corresponds to a 2nd binary value=2; the 4th encoded land 509 corresponds to a 3rd binary value=4; the 5th encoded land 508 (not present) corresponds to a 4th binary value=8; the 6th encoded land 507 (not present) corresponds to a 5th binary value=16; the 7th encoded land 506 (not present) corresponds to a 6th binary value=32; the 8th encoded land 505 (not present) corresponds to a 7th binary value=64; and the 9th encoded land 504 (not present) corresponds to an 8th binary value=128.

Figure 6:
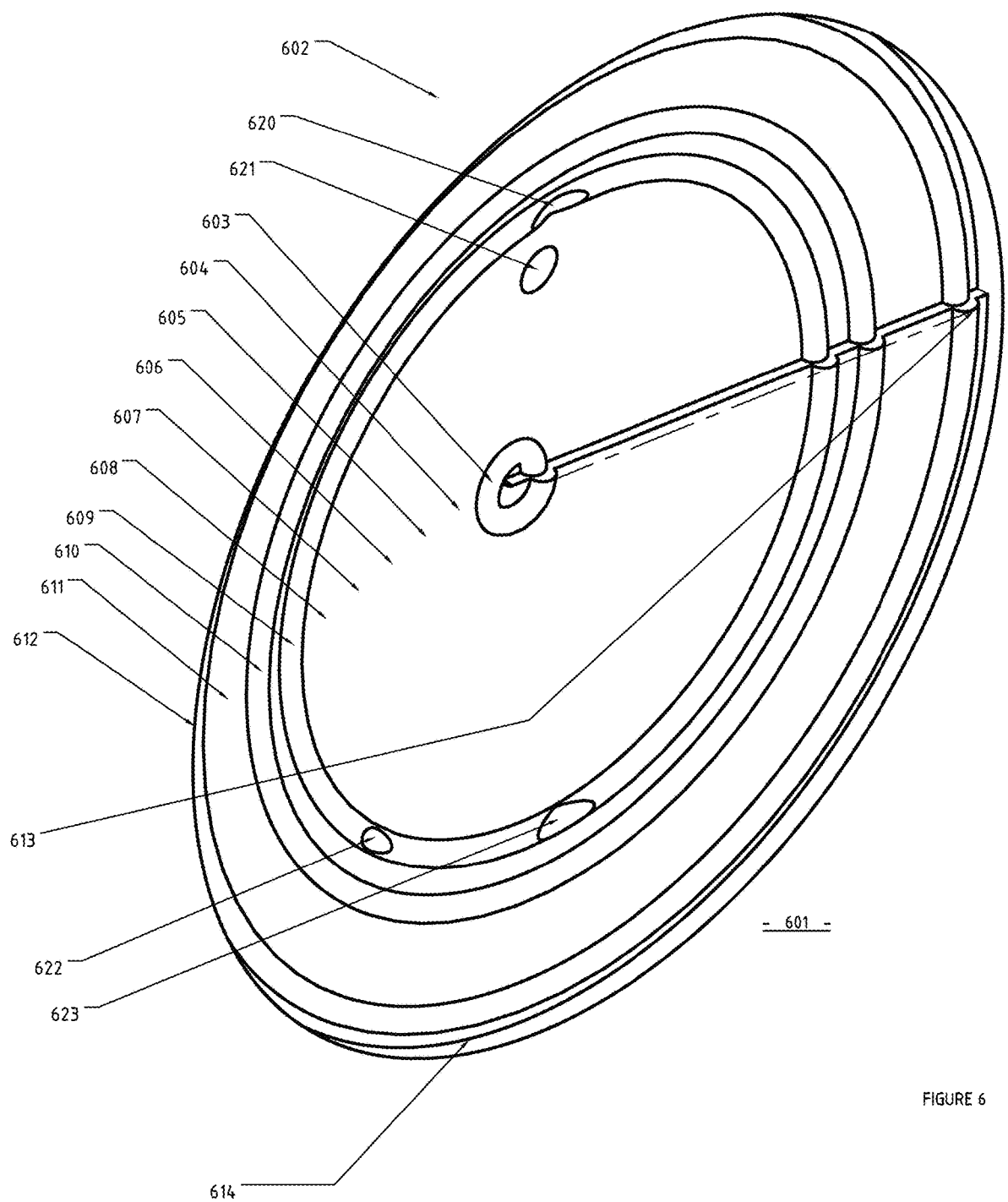
FIG. 6 is an isometric view of a three-dimensional circular ring pattern with cutting edge line and surface anomalies according to another embodiment of the disclosed technology.
Figure 7:
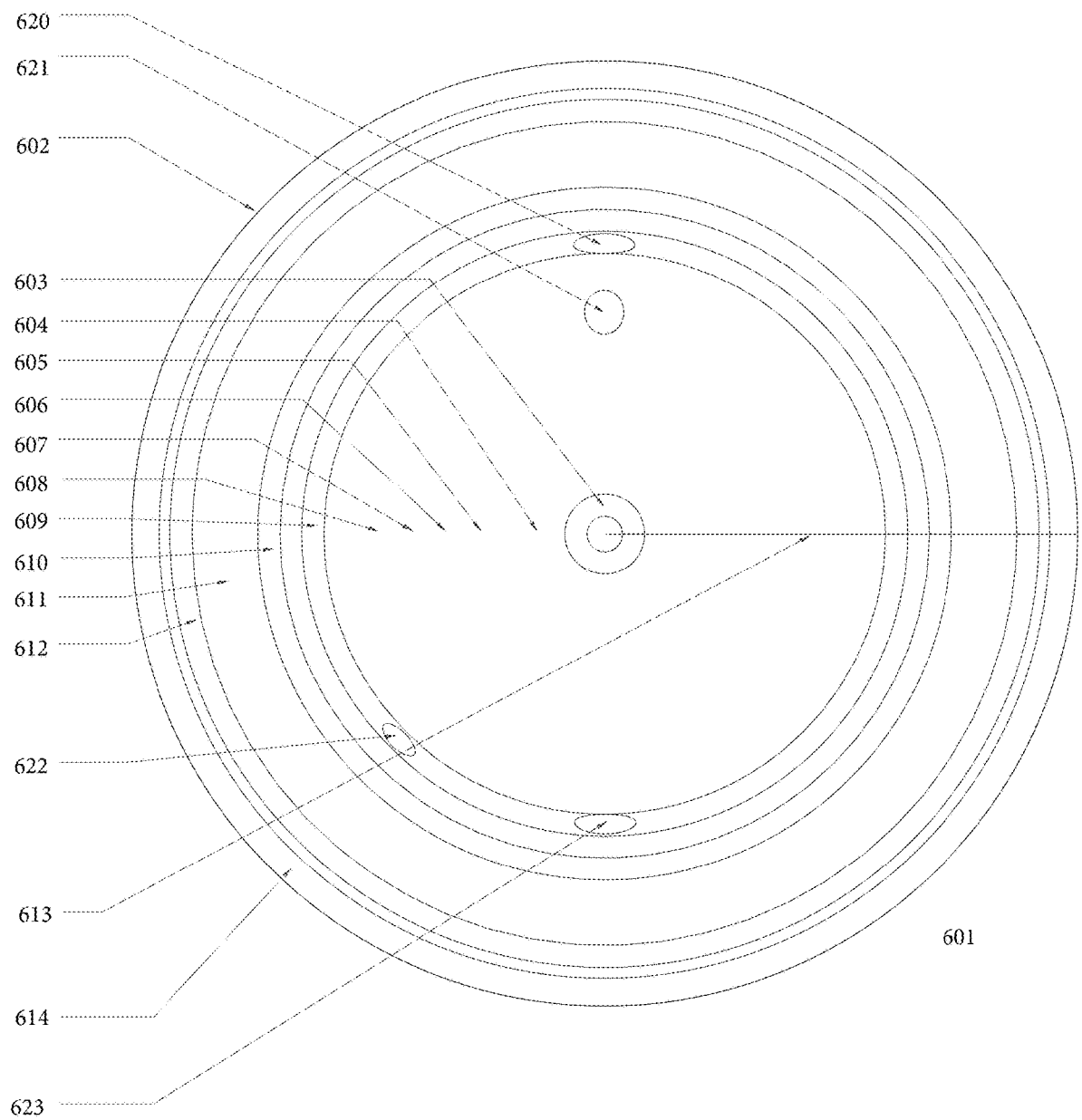
FIG. 7 is a plan view of the ring pattern shown in FIG. 6.

FIGS. 6 and 7 illustrate a three-dimensional circular ring pattern 601 representing a value of 6 that is similar to ring pattern 301 discussed above with respect to FIGS. 3 and 4 with the addition of various surface anomalies or spots. In the depicted embodiment, the surface anomalies or spots include a spot marking 620 on the 4th encoded land for the 3rd binary value at the top center, 0=360 degree position. A spot marking 621 is positioned on the missing 6th encoded land for the 5th binary value at the top center, 0=360, degree position. A spot marking 622 is positioned on the 4th encoded land for the 3rd binary value at the bottom center, 180 degree position, and spot marking 623 is positioned on the 4th encoded land for the 3rd binary value at the lower left, 233 degree position. The surface anomalies or spots can be randomly/unintentionally generated as part of the production process (e.g., surface anomalies) or intentional (e.g., spots). The intentional marking can be used to encode additional information within the circular ring pattern. Spots intentionally positioned at different land positions and angles can increase the data density of the pattern (see e.g., FIG. 11). The surface anomalies can be captured with a camera and logged in a database for later characterization and authentication, as explained more fully below with respect to FIG. 23.

The 2D bar code pattern 602 includes an outer periphery 612 corresponding to a 1st encoded land data bracket and an inner periphery 603 corresponding to the 10th encoded land data bracket. The 2nd encoded land 611 (not present) corresponds to a 1st binary value=1; the 3rd encoded land 610 corresponds to a 2nd binary value=2; the 4th encoded land 609 corresponds to a 3rd binary value=4; the 5th encoded land 608 (not present) corresponds to a 4th binary value=8; the 6th encoded land 607 (not present) corresponds to a 5th binary value=16; the 7th encoded land 606 (not present) corresponds to a 6th binary value=32; the 8th encoded land 605 (not present) corresponds to a 7th binary value=64; and the 9th encoded land 604 (not present) corresponds to an 8th binary value=128.

Figure 8:
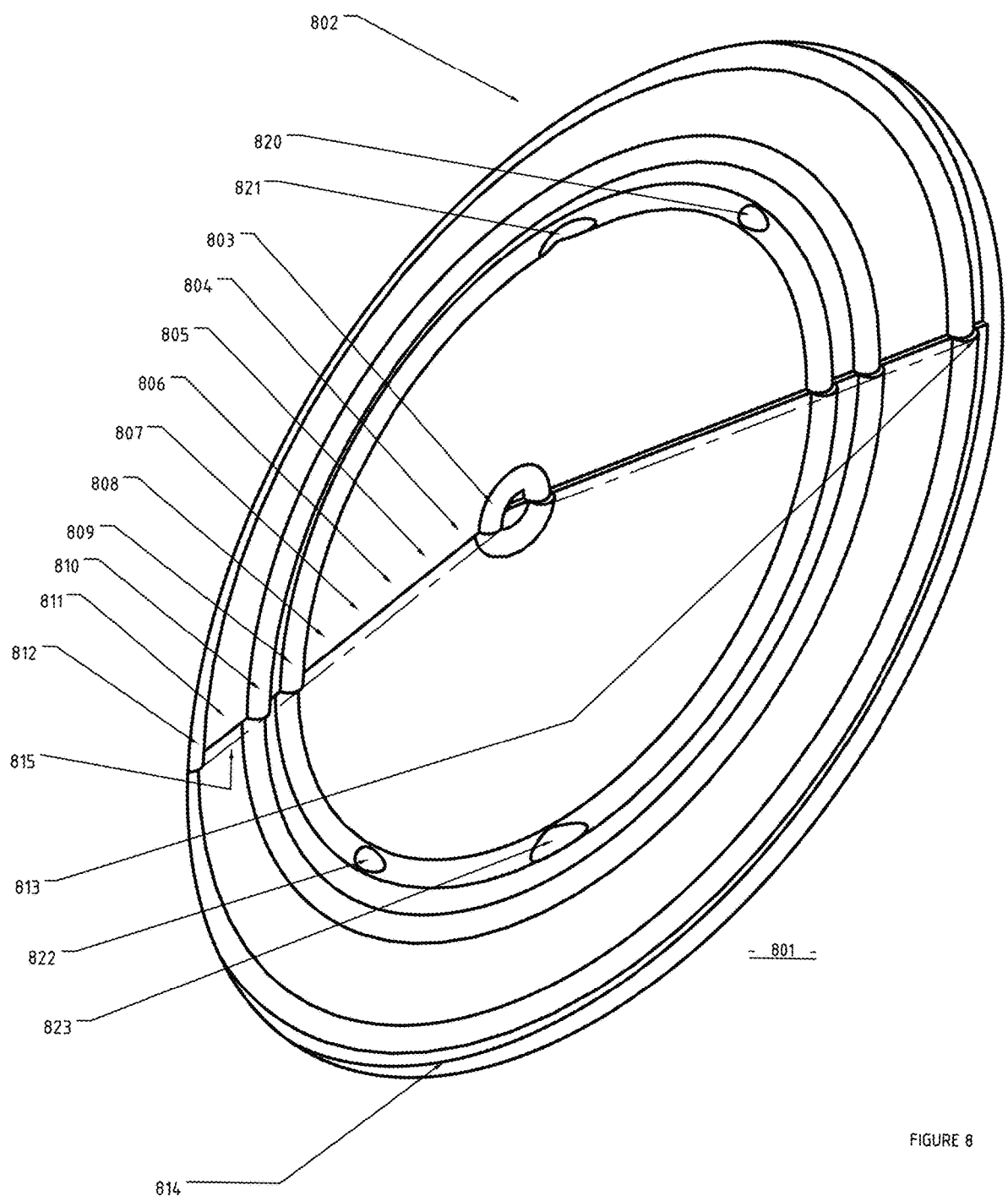
FIG. 8 is an isometric view of a three-dimensional circular ring pattern with a dual cutting edge line and surface anomalies according to an embodiment of the disclosed technology.
Figure 9:
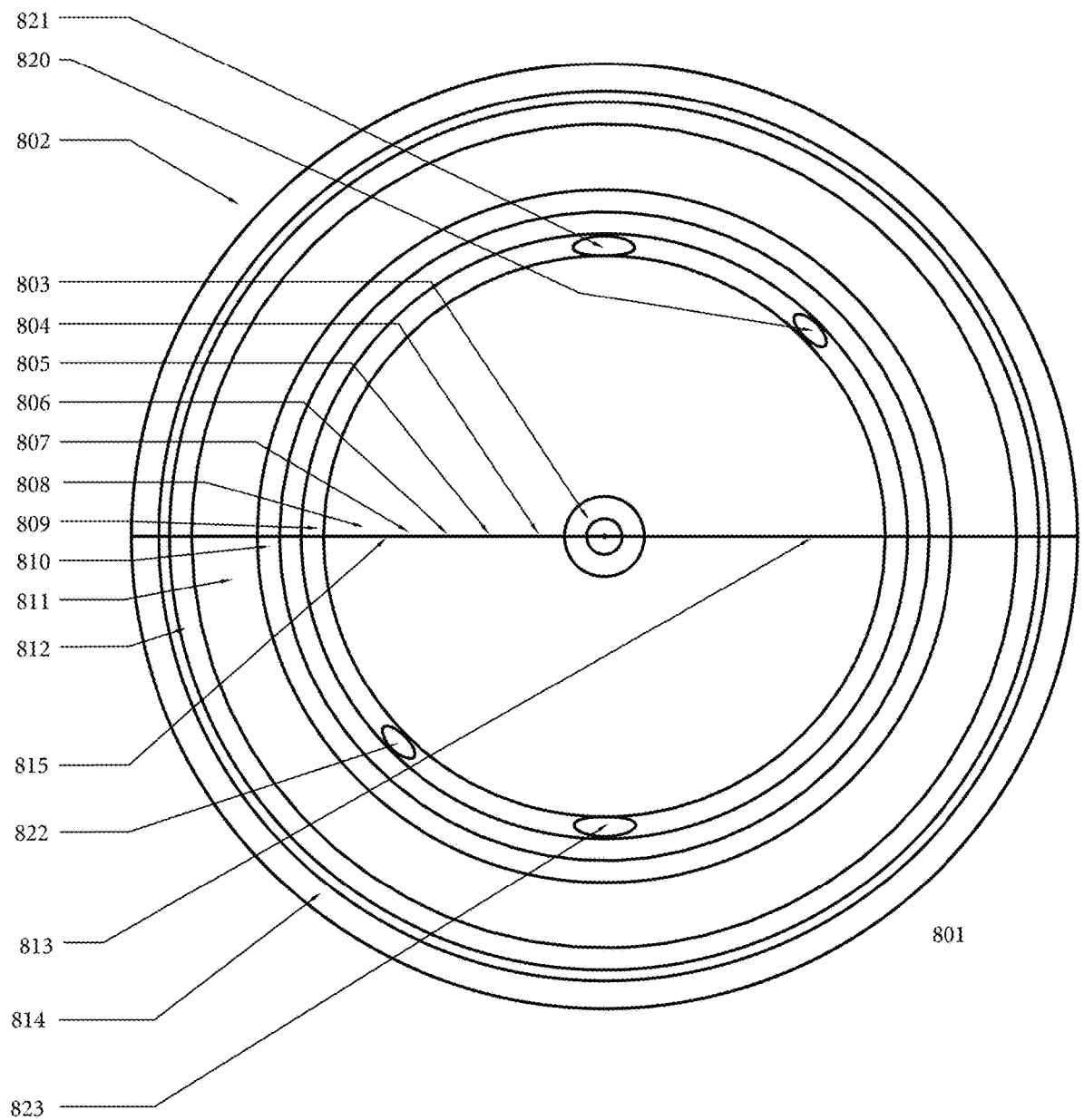
FIG. 9 is a plan view of the ring pattern shown in FIG. 8.

FIGS. 8 and 9 illustrate a three-dimensional circular ring pattern 801 representing a value of 6 that is similar to ring pattern 301 discussed above with respect to FIGS. 3 and 4 with the addition of various surface anomalies or spots. Circular ring pattern 801 also includes both a cutting edge line 813 extending from the center at a 90 degree angle and cutting edge line 815 extending from the center at a 270 degree angle.

In the depicted embodiment, the surface anomalies or spots include a spot marking 820 on the 4th encoded land for the 3rd binary value at the upper right, 45 degree position. A spot marking 821 is positioned on the 4th encoded land at the top center, 0=360, degree position. A spot marking 822 is positioned on the 4th encoded land at the bottom center, 233 degree position, and spot marking 823 is positioned on the 4th encoded land at the lower left, 180 degree position.

The 2D bar code pattern 802 includes an outer periphery 812 corresponding to a 1st encoded land data bracket and an inner periphery 803 corresponding to the 10th encoded land data bracket. The 2nd encoded land 811 (not present) corresponds to a 1st binary value=1; the 3rd encoded land 810 corresponds to a 2nd binary value=2; the 4th encoded land 809 corresponds to a 3rd binary value=4; the 5th encoded land 808 (not present) corresponds to a 4th binary value=8; the 6th encoded land 807 (not present) corresponds to a 5th binary value=16; the 7th encoded land 806 (not present) corresponds to a 6th binary value=32; the 8th encoded land 805 (not present) corresponds to a 7th binary value=64; and the 9th encoded land 804 (not present) corresponds to an 8th binary value=128.

Figure 10:
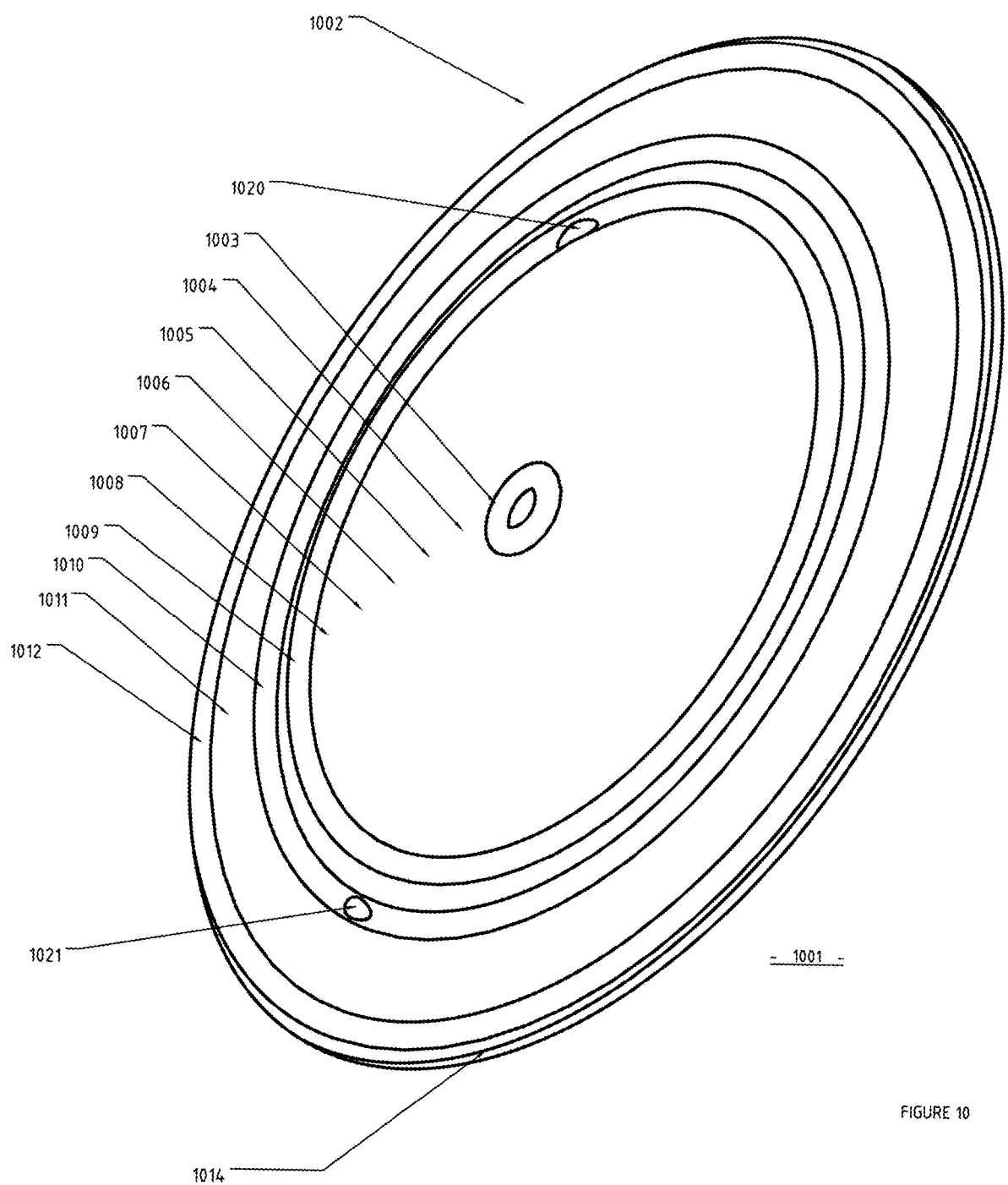
FIG. 10 is an isometric view of a three-dimensional circular ring pattern with surface anomalies according to an embodiment of the disclosed technology.

FIG. 10 illustrates a three-dimensional circular ring pattern 1001 representing a value of 6 including the addition of various surface anomalies or spots, but without any cutting edges. In the depicted embodiment, the surface anomalies or spots include a spot marking 1020 on the 4th encoded land for the 3rd binary value at the top center, 0=360 degree position and a spot marking 1021 positioned on the 3rd encoded land for the 2nd binary value at the lower left, 233 degree position.

The 2D bar code pattern 1002 includes an outer periphery 1012 corresponding to a 1st encoded land data bracket and an inner periphery 1003 corresponding to the 10th encoded land data bracket. The 2nd encoded land 1011 (not present) corresponds to a 1st binary value=1; the 3rd encoded land 1010 corresponds to a 2nd binary value=2; the 4th encoded land 1009 corresponds to a 3rd binary value=4; the 5th encoded land 1008 (not present) corresponds to a 4th binary value=8; the 6th encoded land 1007 (not present) corresponds to a 5th binary value=16; the 7th encoded land 1006 (not present) corresponds to a 6th binary value=32; the 8th encoded land 1005 (not present) corresponds to a 7th binary value=64; and the 9th encoded land 1004 (not present) corresponds to an 8th binary value=128.

FIG. 11 shows variable digital data for the 8 bit binary encoded lands having single or dual rotating edge markings (e.g., cutting edges) and spots. In some embodiments, there can be 36 marking locations at 10 deg. Increments single cutting land=1 mark.

Figure 12:
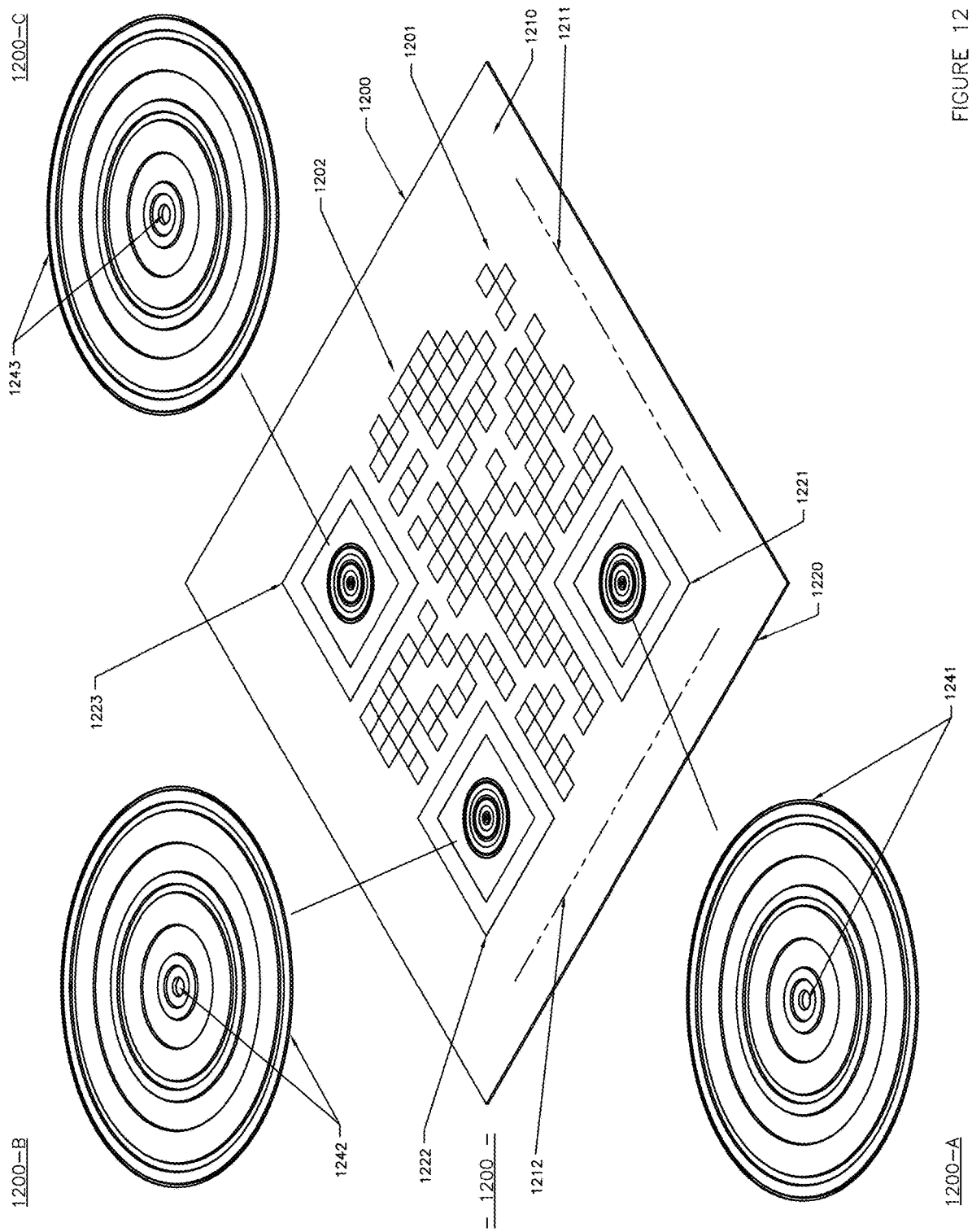
FIG. 12 is an isometric view of a quick response pattern having a three corner locating pattern comprising three-dimensional ring patterns according to an embodiment of the disclosed technology.
Figure 13:
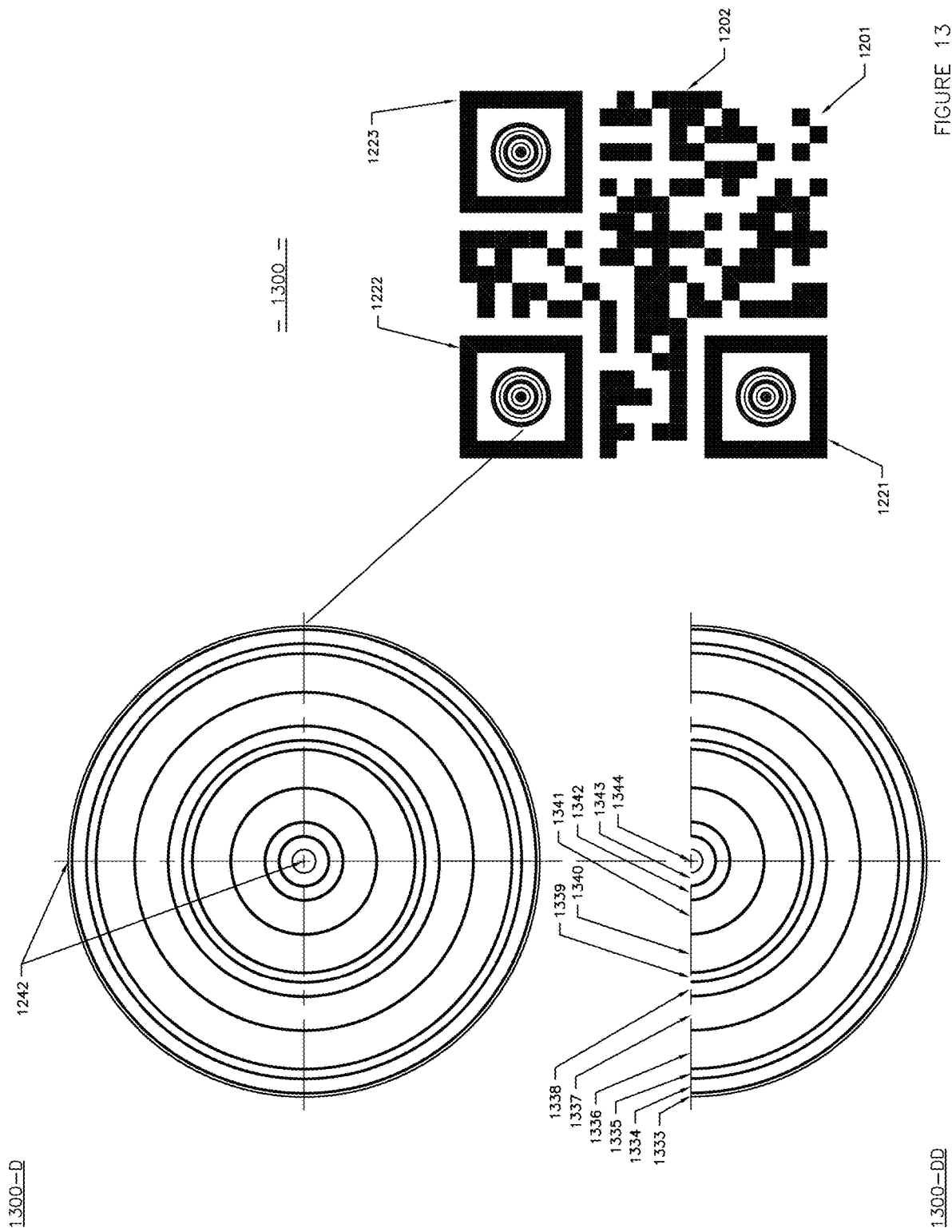
FIG. 13 is a plan view of the quick response pattern shown in FIG. 12.

FIGS. 12 and 13 illustrate a quick response pattern 1201 having a three corner locating pattern comprising three-dimensional ring patterns 1241, 1242, and 1243 according to an embodiment of the disclosed technology. In the depicted embodiment, the three-dimensional ring patterns 1241, 1242, and 1243 each include the interleaved 2 of 5 (i2of5) smooth wide bar encoding. Although described as the wide bar ring pattern here, any of the disclosed three-dimensional ring patterns disclosed herein are suitable for use a the locating pattern for quick response pattern 1201. The quick response pattern 1201 can be printed on a surface 1210 of substrate 1200 or directly on a workpiece or article. Accordingly, the ring patterns are also formed into the substrate 1200. The opposite surface 1220 of the substrate can include an adhesive for attaching the substrate to an article to be tracked and/or authenticated.

The quick response pattern 1201 includes multiple individual data elements 1202 for the encoded 999999 data and corresponding decoding data. The quick response pattern 1201 has a horizontal X axis 1211 and a vertical Y axis 1212. Each three-dimensional ring pattern 1241, 1242, and 1243 of the locating and alignment pattern includes a corresponding border 1221, 1222, and 1223, respectively.

With reference to FIG. 13, a representative embodiment of the three-dimensional (3D) ring patterns can be encoded as follows: Optional corresponding border spacing 1333 for the outer 3D encoded land for clearance to the adjacent substrate; 3D encoded circular land's 1st I2of5 data element 1334 being a narrow raised bar=Bar 0; 3D encoded circular land's 2nd I2of5 data element 1335 being a narrow lower space=space 0; 3D encoded circular land's 3rd I2of5 data element 1336 being a 3× wide smooth raised bar=bar 1; 3D encoded circular land's 4th I2of5 data element 1337 being a 3× wide lower space=space 1; 3D encoded circular land's 5th I2of5 data element 1338 being a narrow raised bar=bar 0; 3D encoded circular land's 6th I2of5 data element 1339 being a narrow lower space=space 0; 3D encoded circular land's 7th I2of5 data element 1340 being a 3× wide smooth raised bar=bar 1; 3D encoded circular land's 8th I2of5 data element 1341 being a 3× wide lower space=space 1; 3D encoded circular land's 9th I2of5 data element 1342 being a narrow raised bar=bar 0; 3D encoded circular land's 10th I2of5 data element 1343 being a narrow lower space=space 0; and 3D encoded circular land's center feature 1344 to indicate the pattern's reading directional finishing end of the encoded circular land's data element pattern.

Figure 14:
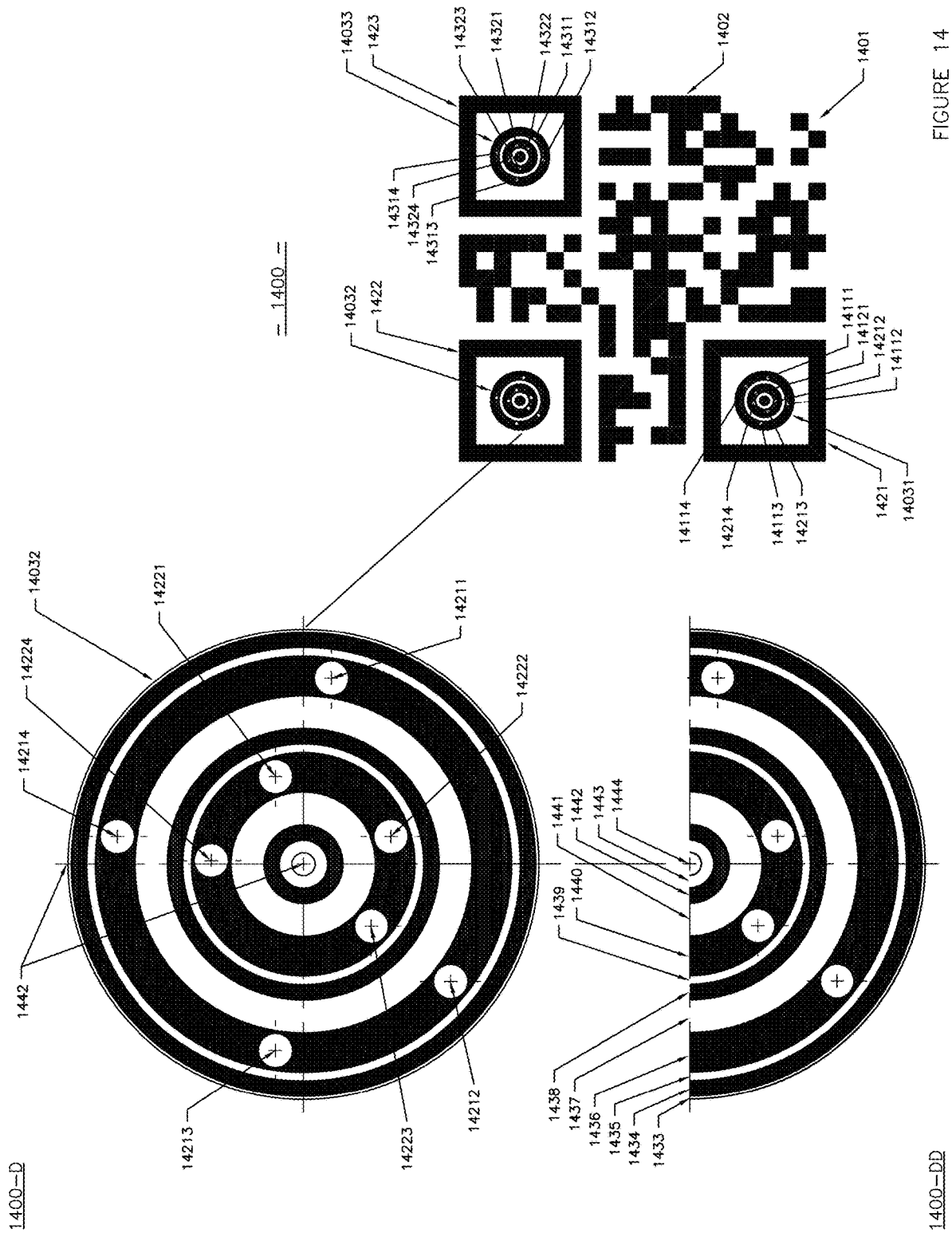
FIG. 14 is a plan view of a quick response pattern having a three corner locating pattern comprising three-dimensional ring patterns including data elements positioned on selected rings according to an embodiment of the disclosed technology.

FIG. 14 illustrates a quick response pattern 1401 having a three corner locating pattern comprising three-dimensional ring patterns 14031, 14032, and 14033 according to an embodiment of the disclosed technology. In the depicted embodiment, the three-dimensional ring patterns 14031, 14032, and 14033 each include the interleaved 2 of 5 (i2of5) smooth wide bar encoding. Each ring pattern can also include unique intentional markings, such as the 2 sets of 4 unique variable RGB colored inked markings on the 3× smooth wide bars. In some embodiments, the markings can be machined, stamped, or otherwise formed into the bars.

The quick response pattern symbol 1400 can include multiple individual data elements 1402 for the encoded 999999 data and corresponding decoding data. Each three-dimensional ring pattern 14031, 14032, and 14033 of the locating and alignment patterns includes a corresponding border 1421, 1422, and 1423, respectively.

Each of the three-dimensional ring patterns 14031, 14032, and 14033 can include respective individual data elements as follows: 1st Unique Variable RGB Colored Marking 14111, 14211, 14311 on the Outer 3× smooth wide bars of the 3D Encoded Land at (a-a) degrees; 2nd Unique Variable RGB Colored Marking 14112, 14212, 14312 on the Outer 3× smooth wide bars of the 3D Encoded Land at (a-b) degrees; 3rd Unique Variable RGB Colored Marking 14113, 14213, 14313 on the Outer 3× smooth wide bars of the 3D Encoded Land at (a-c) degrees; 4th Unique Variable RGB Colored Marking 14114, 14214, 14314 on the Outer 3× smooth wide bars of the 3D Encoded Land at (a-d) degrees; 1st Unique Variable RGB Colored Marking 14121, 14221, 14321 on the Inner 3× smooth wide bars of the 3D Encoded Land at (b-a) degrees; 2nd Unique Variable RGB Colored Marking 14122, 14222, 14322 on the Inner 3× smooth wide bars of the 3D Encoded Land at (b-b) degrees; 3rd Unique Variable RGB Colored Marking 14123, 14223, 14323 on the Inner 3× smooth wide bars of the 3D Encoded Land at (b-c) degrees; and 4th Unique Variable RGB Colored Marking 14124, 14224, 14324 on the Inner 3× smooth wide bars of the 3D Encoded Land at (b-d) degrees.

A representative embodiment of the three-dimensional (3D) ring patterns 14031, 14031, and 14031 can be encoded as follows: Optional corresponding border spacing 1433 for the outer 3D Encoded Land for clearance to the adjacent substrate; 3D Encoded Circular Land's 1st I2of5 Data Element 1434 being a narrow raised bar=Bar 0; 3D Encoded Circular Land's 2nd I2of5 Data Element 1435 being a narrow lower space=Space 0; 3D Encoded Circular Land's 3rd I2of5 Data Element 1436 being a 3× wide smooth raised bar=Bar 1; 3D Encoded Circular Land's 4th I2of5 Data Element 1437 being a 3× wide lower space=Space 1; 3D Encoded Circular Land's 5th I2of5 Data Element 1438 being a narrow raised bar=Bar 0; 3D Encoded Circular Land's 6th I2of5 Data Element 1439 being a narrow lower space=Space 0; 3D Encoded Circular Land's 7th I2of5 Data Element 1440 being a 3× wide smooth raised bar=Bar 1; 3D Encoded Circular Land's 8th I2of5 Data Element 1441 being a 3× wide lower space=Space 1; 3D Encoded Circular Land's 9th I2of5 Data Element 1442 being a narrow raised bar=Bar 0; 3D Encoded Circular Land's 10th I2of5 Data Element 1443 being a narrow lower space=Space 0; and 3D Encoded Circular Land's center feature 1444 to indicate the pattern's reading directional finishing end of the Encoded Circular Land's data element pattern.

Figure 15:
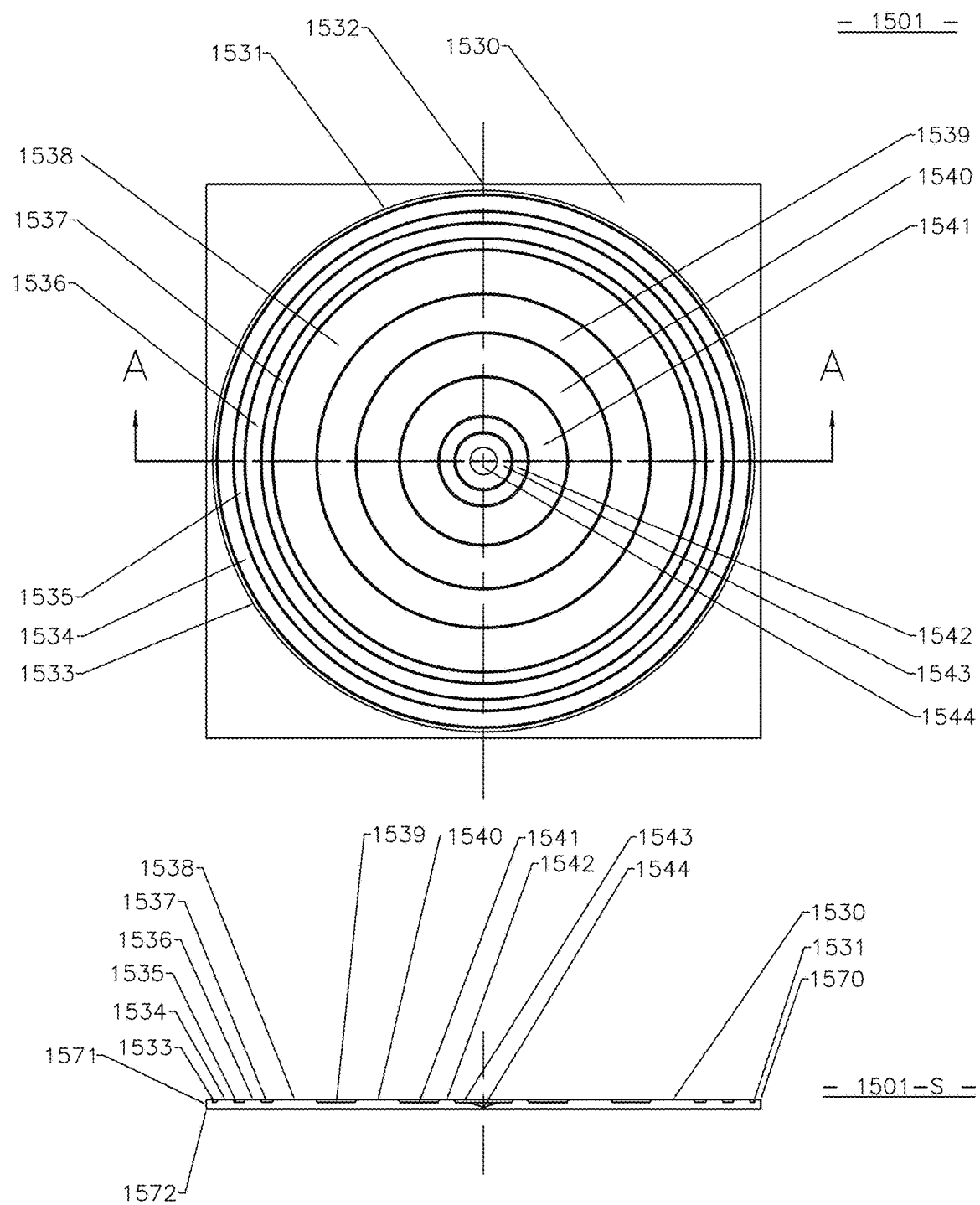
FIG. 15 illustrates a ring pattern according to an embodiment of the disclosed technology having rings comprised of flat lands.

FIG. 15 illustrates a three-dimensional ring pattern 1531 disposed on a flat surface 1530 of a verification substrate 1501 according to an embodiment of the disclosed technology. In the depicted embodiment, the three-dimensional ring pattern 1531 includes the interleaved 2 of 5 (i2of5) smooth wide bar encoding.

A representative embodiment of the three-dimensional (3D) ring pattern 1531 can be encoded as follows: Optional corresponding border spacing 1533 for the outer 3D encoded land for clearance to the adjacent substrate; 3D encoded circular land's 1st I2of5 data element 1534 being a narrow raised bar=bar 0; 3D encoded circular land's 2nd I2of5 data element 1535 being a narrow lower space=space 0; 3D encoded circular land's 3rd I2of5 data element 1536 being a narrow raised bar=bar 0; 3D encoded circular land's 4th I2of5 data element 1537 being a narrow lower space=space 0; 3D encoded circular land's 5th I2of5 data element 1538 being a 3× wide smooth raised bar=bar 1; 3D encoded circular land's 6th I2of5 data element 1539 being a 3× wide lower space=space 1; 3D encoded circular land's 7th I2of5 data element 1540 being a 3× wide smooth raised bar=bar 1; 3D encoded circular land's 8th I2of5 data element 1541 being a 3× wide lower space=space 1; 3D encoded circular land's 9th I2of5 data element 1542 being a narrow raised bar=bar 0; 3D encoded circular land's 10th I2of5 data element 1543 being a narrow lower space=space 0; and 3D encoded circular land's center feature 1544 to indicate the pattern's reading directional finishing end of the encoded circular land's data element pattern. The substrate or workpiece or article 1571 for utilizing the encoded pattern symbol can have a forward facing 1st surface 1570 and back facing 2nd surface 1572. In some embodiments, the symbol pattern can have an individual data element and/or alignment locating pattern 1532.

Figure 16:
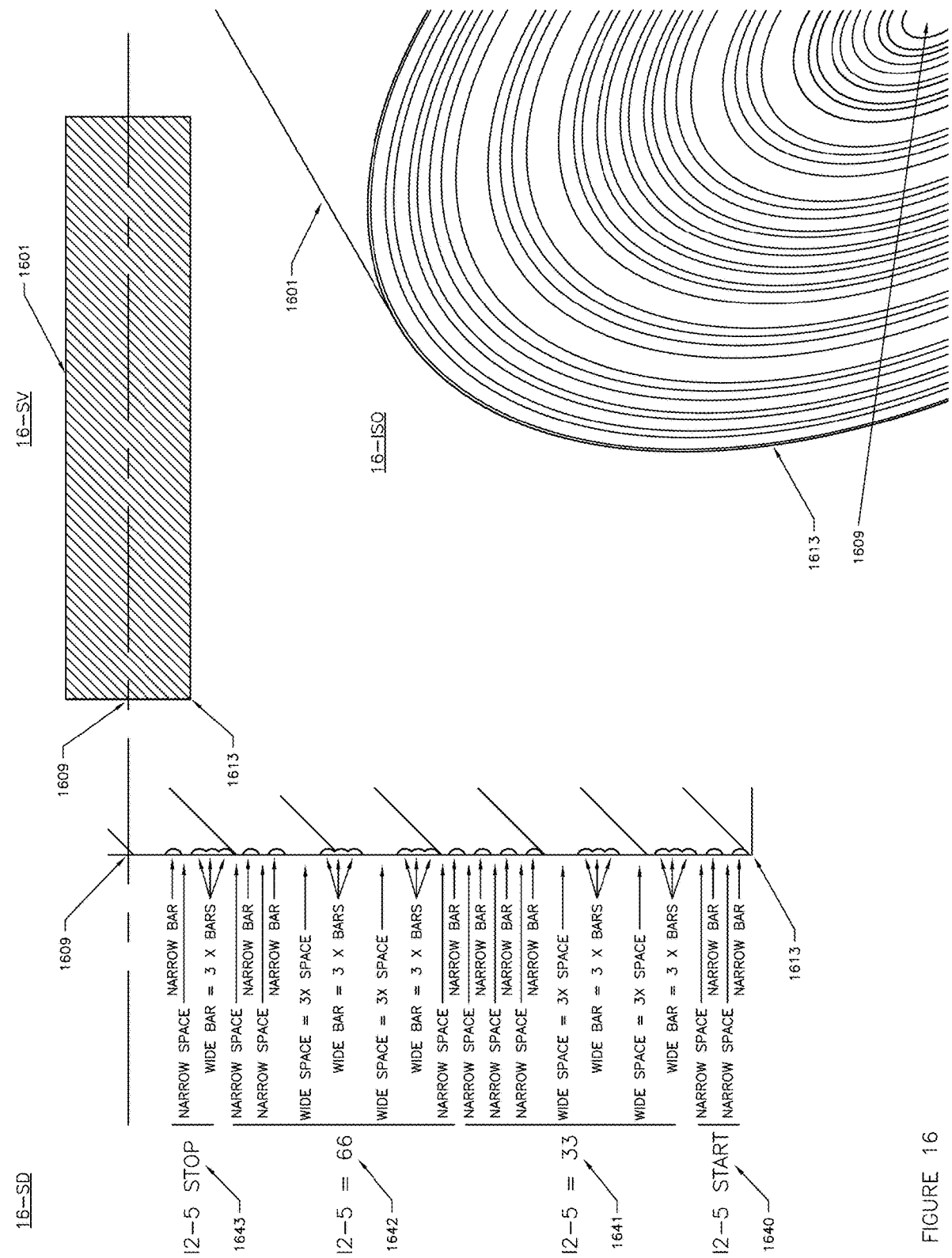
FIG. 16 illustrates a stamping tool configured to form a ring pattern in a substrate according to an embodiment of the disclosed technology.

FIG. 16 illustrates a ring pattern impression forming tool 1601 according to embodiments of the disclosed technology. The forming tool 1601 is configured to encode circular lands forming an impression in the I2of5 format including a start control character 1640, a 33 data value 1641, 66 data value 1642, and a stop control character 1643. The tool includes a center-line 1609 and an outer peripheral edge 1613. In some embodiments, the impression forming tool 1601 pressed into to a verification substrate or article to emboss/deboss the ring pattern into the surface.

Figure 17:
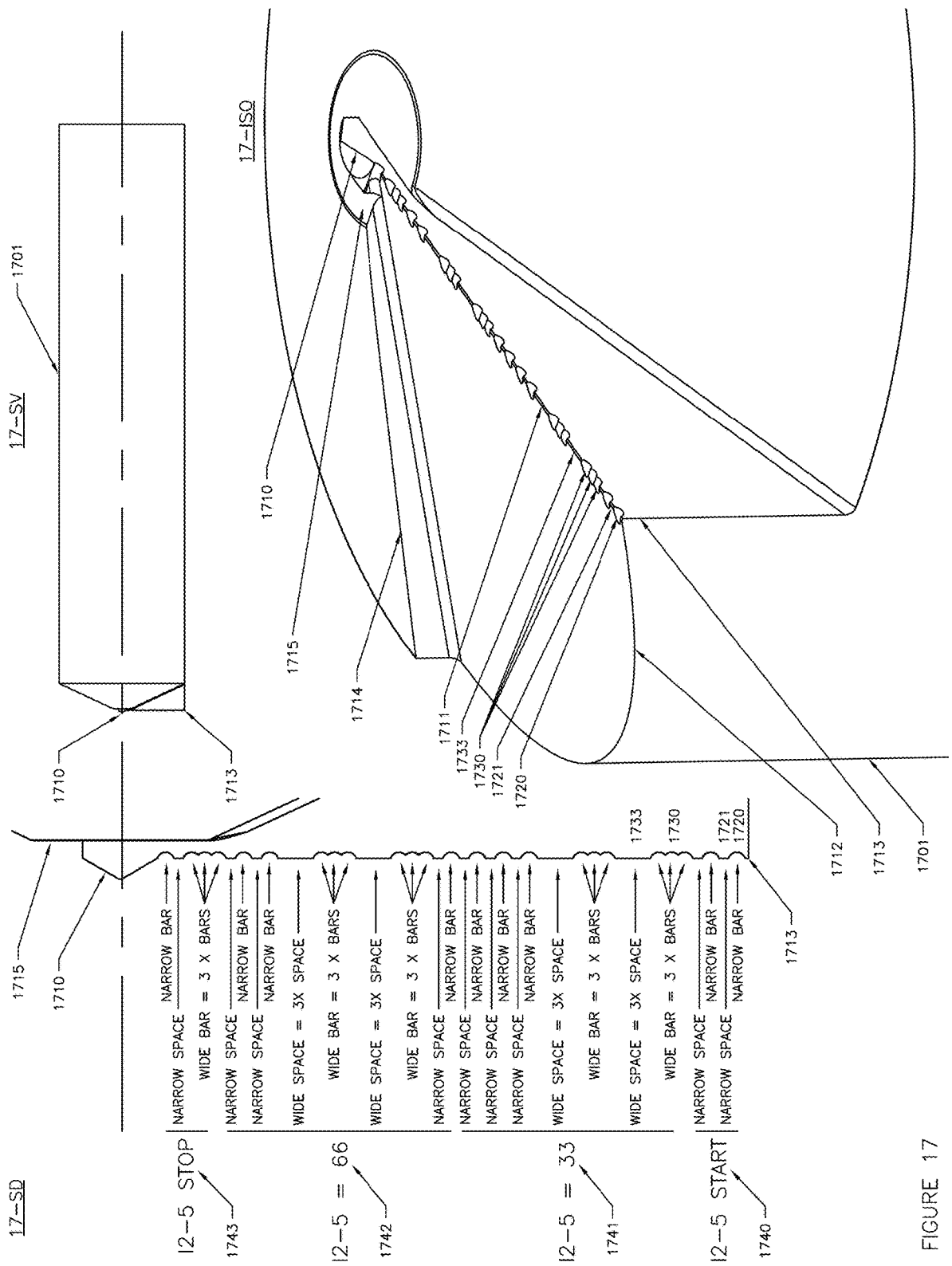
FIG. 17 illustrates a cutting tool configured to form a ring pattern in a substrate according to an embodiment of the disclosed technology.

FIG. 17 illustrates a ring pattern cutting tool 1701 according to embodiments of the disclosed technology. In the depicted embodiment, the tool is a single flute drill tool; however, dual flute drill tools are suitable as well. The cutting tool 1701 is configured to encode circular lands forming an impression in the I2of5 format including a start control character 1740, a 33 data value 1741, 66 data value 1742, and a stop control character 1743. The tool includes a center drilling projection 1710 and an outer peripheral edge 1713.

Cutting tool 1701 can include a single flute 1711 for the encoded land's drilling and/or rotational embossing/debossing operation(s). The flute 1711 can have a working edge relief 1712, an operational clearance offset 1714, and a clearance relief 1715 from the center drilling projection. The I2of5 pattern can include, for example, raised narrow bars 1720, lower narrow spaces 1721, raised 3× wide bars 1730, and lower 3× wide spaces 1733.

Figure 18:
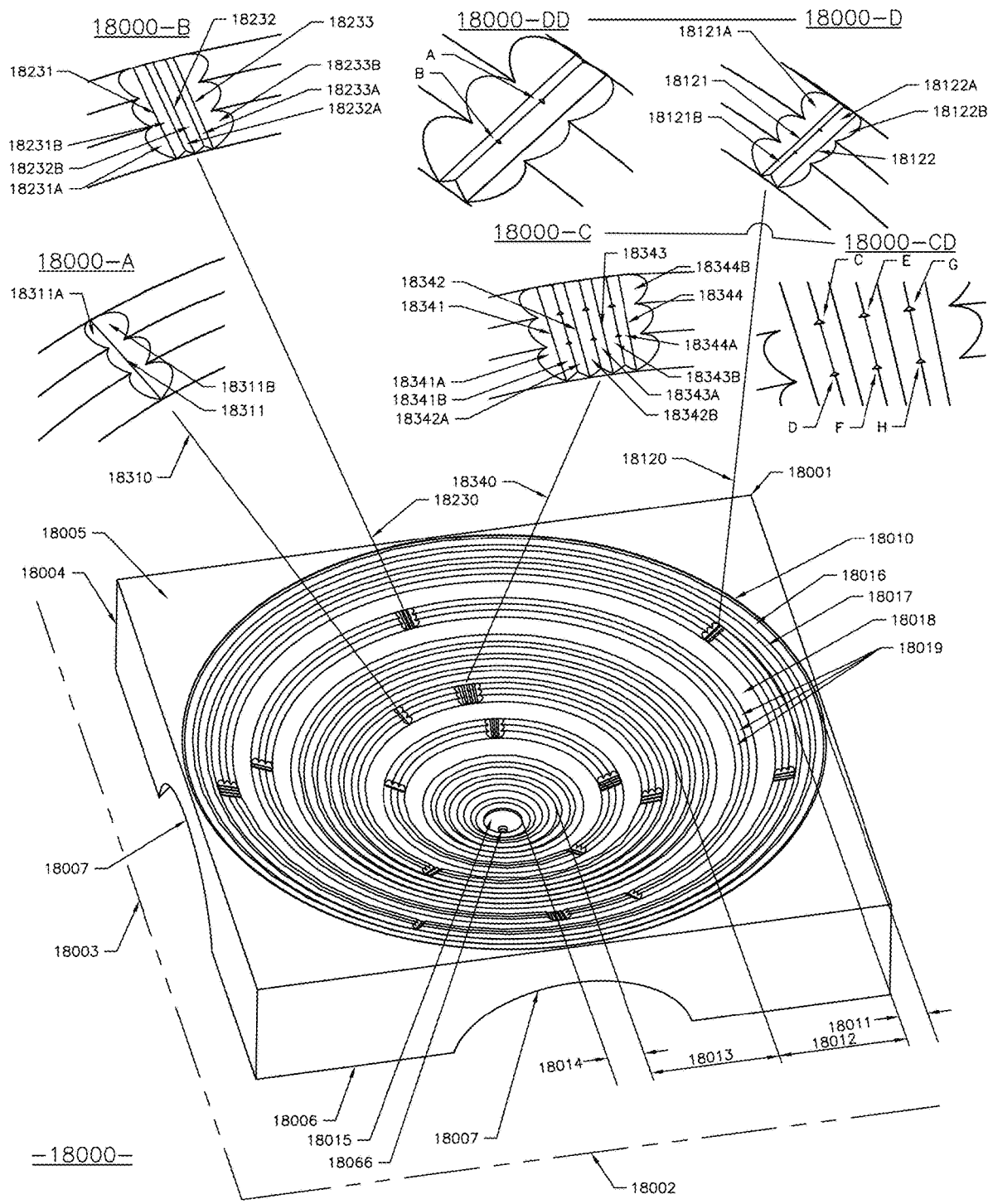
FIG. 18 is an isometric view of a three-dimensional circular ring pattern with radial data elements positioned on selected rings according to an embodiment of the disclosed technology.
Figure 19:
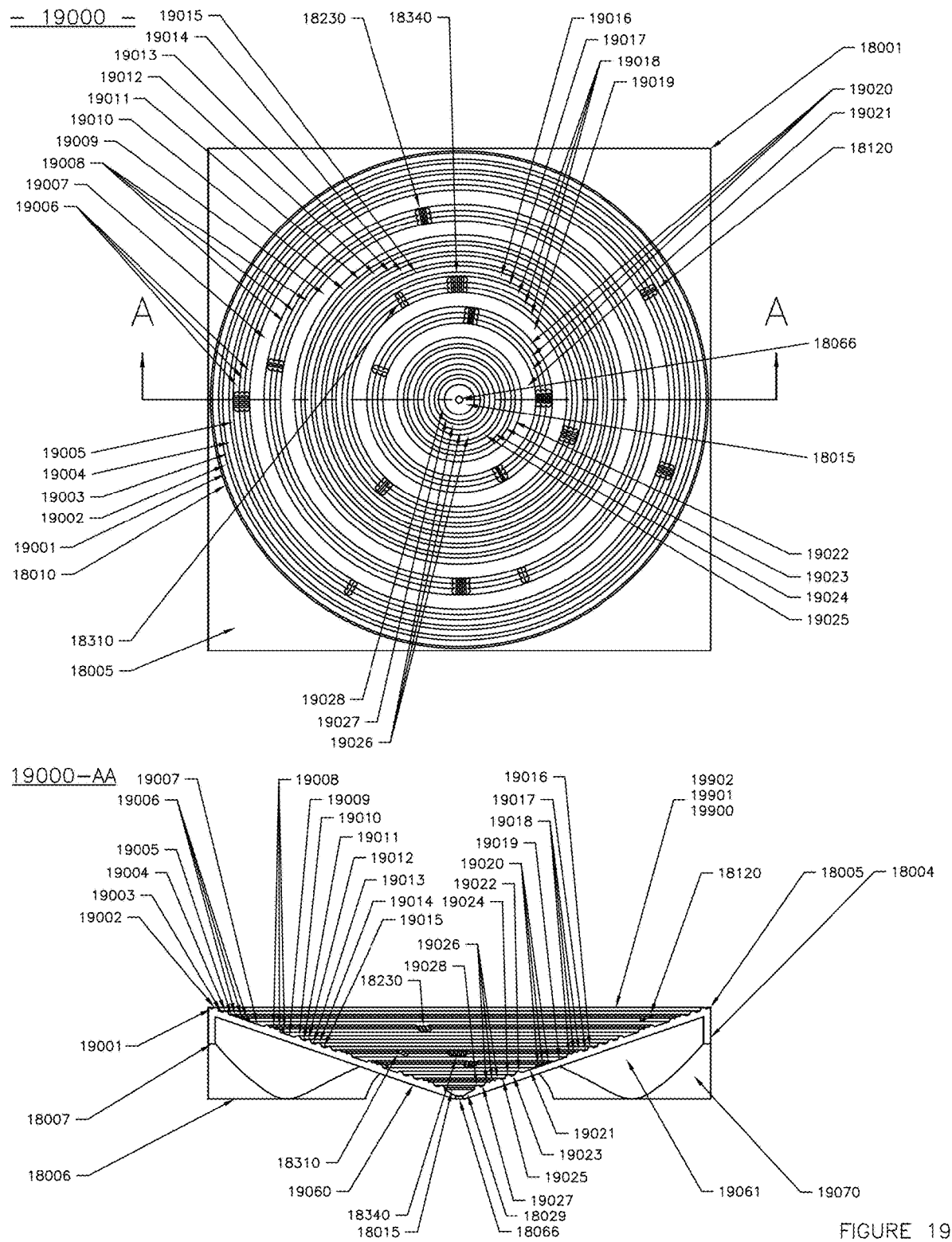
FIG. 19 illustrates a plan view and cross-section of the ring pattern shown in FIG. 18.

FIGS. 18 and 19 illustrate an authenticatable tag 18001 including three-dimensional ring pattern 18010 formed in a first surface 18005 of a verification substrate 18004 according to an embodiment of the disclosed technology. In the depicted embodiment, the three-dimensional ring pattern 18010 includes the interleaved 2 of 5 (i2of5) smooth wide bar encoding with various radial marking located at various angles about the circular 3× wide bar data lands. The ring pattern 18010 includes a start control character 18011, a 33 data value 18012, 66 data value 18013, and a stop control character 18014. The symbol pattern can have a horizontal X axis 18002 and a vertical Y axis 18003. The back facing 2nd surface 18006 can include one or more reliefs 18007.

The symbol pattern can include a center feature 18015 to indicate the pattern's reading directional finishing end. An illumination and inspection registration—relative reference through hole 18066 can be located in the center feature 18015 to facilitate alignment. The different bar and space configurations are illustrated as encoded circular lands I2of5 data element being a narrow raised bar 18016=bar 0; encoded circular lands I2of5 data element being a narrow lower space 18017=space 0; encoded circular lands I2of5 data element being a 3× wide lower space 18018=space 1; and encoded circular lands I2of5 data element being a 3× raised bars 18019=bar 1.

As noted above, the symbol pattern 18010 can include various radial markings, such as outer 3× raised bars 18120 circular encoded land's 2 radial v notched markings at (a-b) degrees; first from outer 3× raised bars 18230 circular encoded land's 3 radial v notched markings at (b-c) degrees; first from inner 3× raised bars 18310 circular encoded land's 1 radial v notched marking at (c-a) degrees; first from inner 3× raised bars 18340 circular encoded land's 4 radial v notched markings at (c-d) degrees;

The radial v notched marking 18310 at (c-a) degrees can comprise a single radial v notch detail 18311 removed from the 3× raised bars of the circular encoded land. The radial v notch detail 18311 can include CCW angled face 18311A and CW angled face 18311B. The radial v notched marking 18230 at (b-c) degrees can comprise three radial v notch details 18231-18233 with corresponding CCW and CW faces A and B, respectively.

The radial v notched markings 18120 at (a-b) degrees can comprise two radial v notch details 18121 and 18122 with corresponding CCW and CW faces A and B, respectively. In some embodiments, the radial markings include facets where the v notches do not fully remove the ribs or rings in the pattern. For example, facet A is the first intersecting material removal detail of the 1st and 2nd radial notches crossing the outer of the 3× raised bars of the circular encoded lands. Facet B is the second intersecting material removal detail of the 1st and 2nd radial notches crossing the inner of the 3× raised bars of the circular encoded lands. The radial v notched markings 18340 at (c-d) degrees can comprise four radial v notch details 18341-18344 with corresponding CCW and CW faces A and B, respectively. In some embodiments, the radial markings include facets C-H as shown. The rings in combination with the radial markings at various degree increments, and the facets can provide a vast number of possible encodable value options.

With reference to FIG. 19, the symbol pattern 18010 can include a clearance detail 19001 between the outer boundary and the 1st raised bar circular land. The symbol pattern 18010 can include various I2of 5 data elements in the form of raised bars and spaces 19002-19028, as shown. As shown in the figures the symbol pattern 18010 is concave in shape with a smooth underside 19060 and surrounding sidewall 19061 enclosing an open region 19070.

Figure 20:
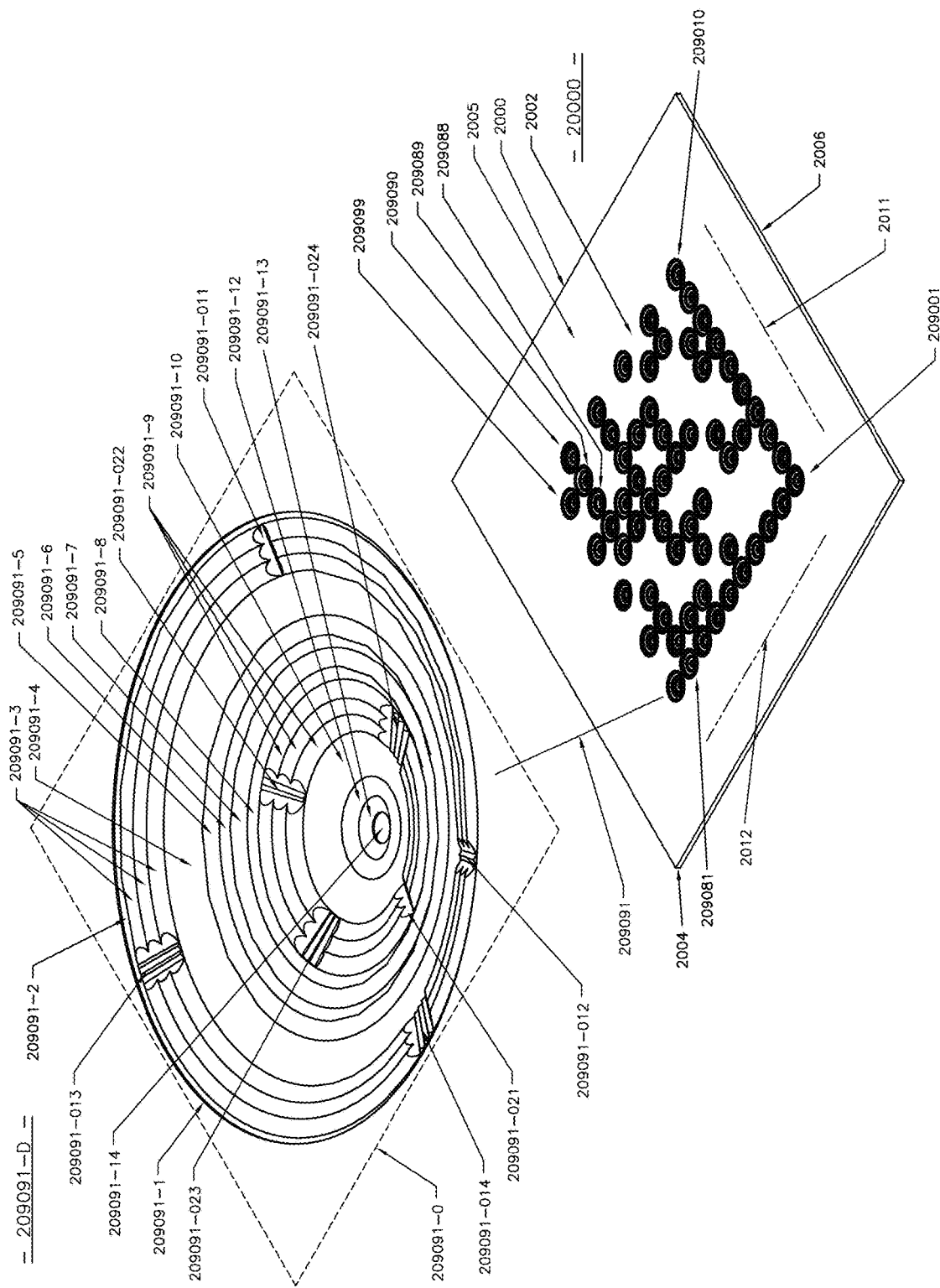
FIG. 20 is an isometric view illustrating a two-dimensional data matrix pattern comprised of individual three-dimensional circular ring patterns according to embodiments of the disclosed technology.
Figure 21:
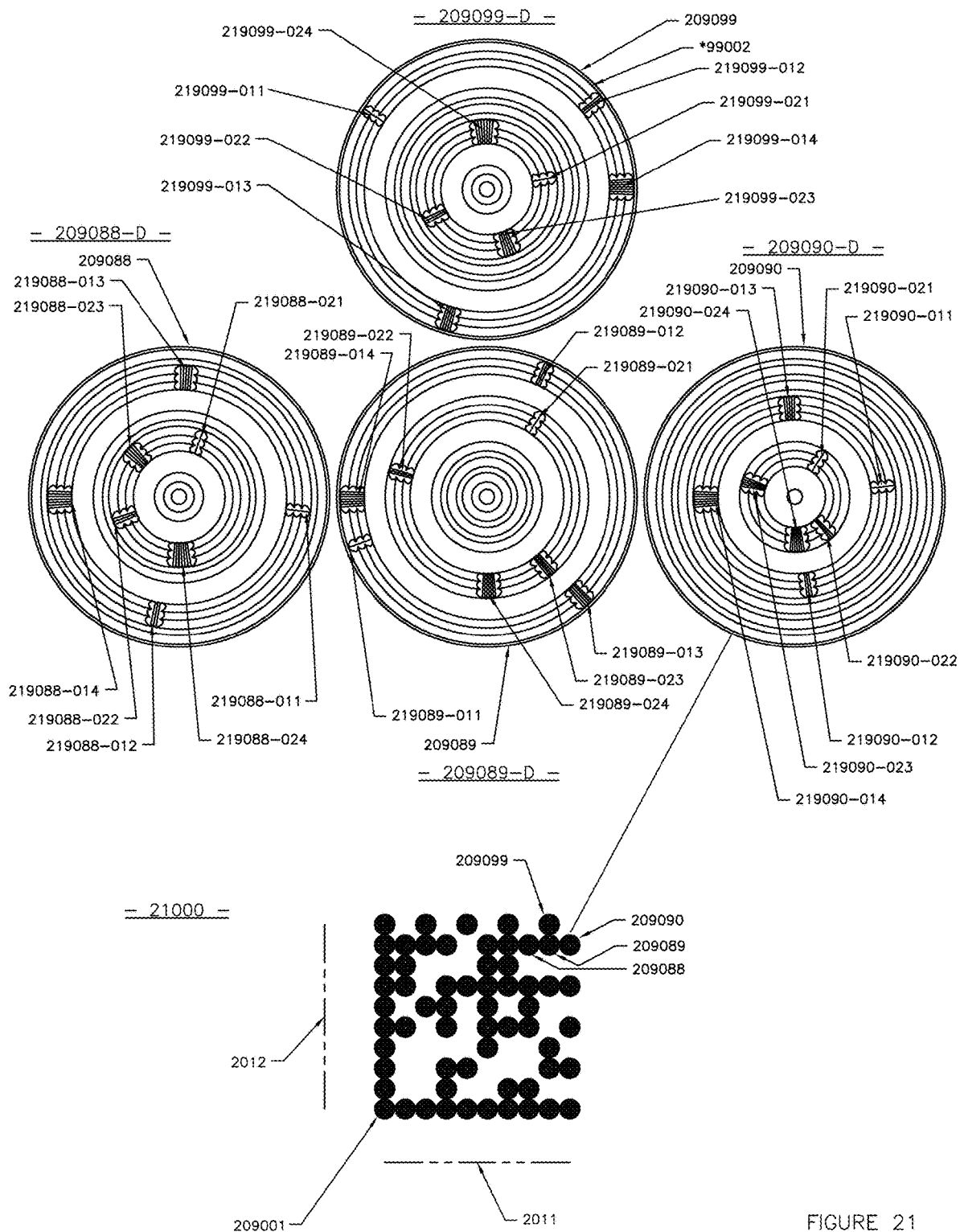
FIG. 21 illustrates a plan view of the two-dimensional data matrix shown in FIG. 20.

FIGS. 20 and 21 illustrate a 10×10 data matrix pattern 2002 according to embodiments of the disclosed technology. The data matrix 2002 is comprised of multiple three dimensional ring patterns e.g., ring patterns 209001, 209010, 209081, 209088-209091, and 209099.

The ring patterns are formed into a substrate 2000 or workpiece or article for utilizing the encoded pattern symbol. The substrate 2000 has a thickness 2004 and first and second opposed surfaces 2005 and 2006, respectively. The data matrix pattern 2002 has a horizontal X axis 2011 and a vertical Y axis 2012. The matrix position 209091-0 for the ring pattern 209091 is column 1 row 10. The ring pattern 209091 includes I2of5 encoded lands and spaces 209091-1 to 209091-14. The ring pattern also includes various radial markings 209091-011 to 209091-014 and 209091-021 to 209091-024.

As shown in FIG. 21, ring pattern 209001 is located at column 1 row 1 of the data matrix 2002. Toward the opposite corner of the data matrix, ring pattern 209088 is located at column 8 row 9; ring pattern 209089 is located at column 9 row 9; ring pattern 209090 is located at column 10 row 9; and ring pattern 209099 is located at column 9 row 10. The ring patterns 209088, 209089, 209090, and 209099 are encoded with data values of 99, 33, 77, and 88, respectively. Each ring pattern also includes various radial markings. Ring pattern 209088 includes radial markings 219088-011 to 219088-014 and 219088-021 to 219088-024. Ring pattern 209089 includes radial markings 219089-011 to 219089-014 and 219089-021 to 219089-024. Ring pattern 209090 includes radial markings 219090-011 to 219090-014 and 219090-021 to 219090-024. Ring pattern 209099 includes radial markings 219099-011 to 219099-014 and 219099-021 to 219099-024.

FIG. 22 shows I2of5 2 and 4 digits codeword data values having 4 unique marking combinations or 4 of the same markings permutations on the 3× Wide Bar Circular Lands for Each Individual Data Element, 2D Quick response V2 code 3× pattern detection locations, 2D 10×10 Data Matrix 19× pattern detection locations, and 2D 10×10 Data Matrix 61× average total individual data elements' locations. All 4 marks being the same at 36 Marking Locations at 10 Deg. Increments without a visible Cutting Land(s).

Figure 23:
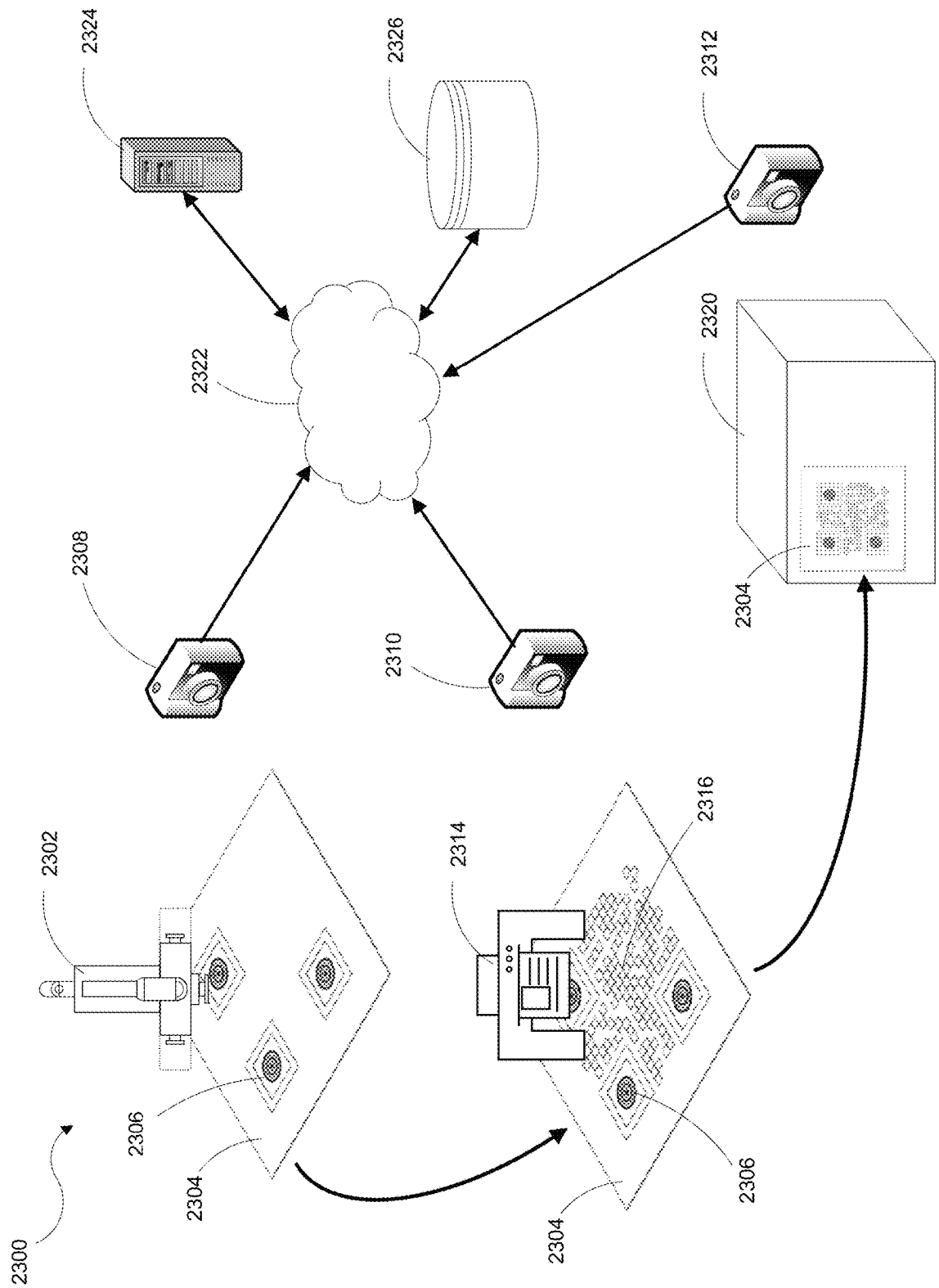
FIG. 23 is a schematic representation of a system for authenticating an article according to embodiments of the disclosed technology.

FIG. 23 illustrates a system 2300 for authenticating an article according to embodiments of the disclosed technology. The system 2300 includes a tag in the form of a verification substrate 2304. In some embodiments, the substrate 2304 can comprise acrylic. One or more circular features 2306, each including a plurality of concentric rings within the circular feature, are formed into the substrate. The rings are arranged in a pattern according to a data encoding schema. The circular features 2306 can be formed as explained above e.g., with a cutting tool in a computer numerically controlled (CNC) machine 2302. In some embodiments, at least one of the plurality of rings includes a surface anomaly, which can be the result of variations in the machining process. In some embodiments, an adhesive is disposed on the verification substrate 2304 for attaching the verification substrate to an article 2320. Once the circular features 2306 are formed into the substrate 2304, a first camera system 2308 captures a first image of the circular features, including the ring patterns and surface anomalies. The first image is stored in a database 2326. The image can be transmitted via a network 2322. In some implementations, multiple verification substrates 2304 are produced in sheets or rolls, which can be shipped to a manufacturer for subsequent printing and attaching to an article to be tracked/authenticated.

A printer 2314 can print each verification substrate 2304 with a bar code, such as a QR code 2316, using the circular features 2306 as a pattern locator. Once printed, a second camera system 2310 can capture a second image which can be used to associate the barcode 2316 with the first image. For example, a computer processing system 2324 can decode the ring patterns of the circular features 2306 and associate that code with the QR code in the database 2326. Once a verification tag/substrate 2304 has been printed, the manufacturer can attach the tag 2304 to the article 2320 for tracking and authenticating.

Once the article 2320 is received by an end user, for example, a third camera system 2312 can capture a third image of the tag 2304 and send it via network 2322 to the computer processing system 2324 for authentication. The computer processing system 2324 can compare the second image of the tag 2304 with the first image stored in database 2326 to determine if the surface anomaly is present in the third image, thereby authenticating the tag 2304 and the article 2320. The image capturing and analysis can be performed with suitable image processing software, such as Affine-SIFT (ASIFT). In some embodiments, hundreds or thousands of anomalies can be captured with the camera systems. In some embodiments, between 200 to 5000 anomalies can be captured. In some embodiments the camera system captures at least 100 surface anomalies.

In some embodiments, the computer processing system 2324 will authenticate a tag only if it can match a certain threshold number or percentage of anomalies between images, for example, 50% or 80%. The above mentioned camera systems can comprise a smartphone camera or other suitable vision/camera system. In some embodiments, the camera system is similar to those described in e.g., U.S. Pat. Nos. 9,573,181 and 10,095,091, incorporated herein by reference below.

Although specific embodiments of, and examples for, the technology are described above for illustrative purposes, various embodiments are possible within the scope of the technology. For example, the 3D individual data elements of the 2D barcode code word/pattern on a workpiece article substrate or frangible tamper verification substrate are comprised of individual 3D encoded data lands with each data land and its adjacent surfaces consisting of multiple physical superpositions, being the results of multiple processing solutions, that are entangled, being the correlations of the intersecting details of different features, to where the data contained in the individual 3D data elements are immutable in that they are not easily or economically replicated via their having both the controlled intentional and random incidental multiple physical superpositions and entanglements thereby creating an encrypted anchor(s) on the article. That are subsequently metrologically captured, statistically quantified, and securely stored creating its "digital twin" at their time of and/or after their all-in-one and/or sequential manufacturing operation(s) and/or logistical distribution and/or article's association and/or article's logistical distribution and/or article's deployment for their subsequent authenticity verification via internal and independent comparisons for validation of the process, for having the intentional individual 3D data land element(s) being utilized to contain specific additional variable data code words.

The disclosed technology's authentication and counterfeit resistance for the individual 3D data element(s) of the 2D barcode's code word can utilize its real-time and point-of-use counterfeit detection security methodologies via the continuous technological advancements for the highly competitive commercial mobile personal telecommunication devices, currently being the "smartphone" having 2.53 billion users worldwide that are continually providing the enhancement emphasis for their improved processing, multitasking capabilities, communications/networking coverage and data transmission security, device security, data compression, increased image resolution, improved 3D image depth capturing, improved secondary image processing, improved 3D optical enhancement lens or lenses and/or attachments, utilizing improved single and multiple imaging sensors/cameras, advanced 3D imaging sensors, advanced image processing subsystems, etc.

The disclosed technology's improved authentication and counterfeit resistance of the 2D barcode pattern symbol(s)

utilizes the intentionally and randomly variable modification(s) of the 2D barcode symbol pattern and/or its individual 3D data element(s) utilizing their multiple unique, tamper evident and tamper resistant identification(s) means of the work-piece article(s) via the creation and utilization of multiple tamper evident mean(s) having uniquely variable digital and analog characteristics for the unique identification of 3D engraved individual data land element(s) being formatted for either, or as a combination of, proprietary, Code 39, Interleaved 2 of 5, etc., encoding at the specifically identified individual data element's location(s), optionally utilizing the 1D barcode pattern symbol codes' corresponding start stop encoding to comprise an industry standard format, or be part of a proprietary encoding format for the 3D individual data element(s), being part of the 2D barcode pattern symbol formatted for being either proprietary or an industry standard Data Matrix, Quick response, etc., data encoding, for having the work-piece article's unique identification 2D codeword(s) data value, being either independent or an integral combination of the individual 3D data element's data value(s) of the individual 3D data element's 3D encoded data lands. Having those individual 3D data element's utilizing the multiple means in having their multiple physical superpositions' and entanglements' unique digital and/or analog variable characteristics creating the individual 3D data elements' having unique immutable multiple characteristics. That are subsequently 1st (a) 3D and/or 2D sequential digital image captures, metrologically determined, mathematically and statistically analyzed, digitally stored as its digital twin, and later utilized for the point-of-use authentication of the work-piece article's unique immutable identification via its (b) 3D and or sequential 2nd image digital captures for a comparative analysis for determining the true and replaceable source of multi-factor authentication of the original work-piece article's unique identification (1st=2nd) and facilitate the real-time point-of-use unique identification authentication or conversely the identification of the counterfeit identification/work-piece article(s) via the detection of its erroneous and/or missing unique 3D engraved individual data elements' valid identification and/or their controlled intentional and random incidental multiple physical superpositions and entanglements (1st 2nd).

Utilizing one, or a combination of the individual 3D data element's multi-factor controlled intentional and/or randomly incidental occurring multiple physical superpositions' and entanglements' unique identification means via the following methods;

1 Intentionally controlled unique variable(s) for the 2D barcode symbol pattern's characteristics for having additional and/or missing individual data element(s) at controlled specific location(s);

2D Barcodes routinely utilize data error correction schemas to be resilient towards physical damage and/or marking errors, image capture errors, etc. of the individual code data elements needed to correctly decode the codeword(s) of a 2D barcode to facilitate the recovery of the intended codeword(s) of the 2D barcode symbol pattern. The current 2D Datamatrix, or industry standard, or proprietary, equivalent barcode could utilize the ECC-200 Reed-Solomon schema, or industry standard, or a proprietary equivalent, with each corresponding 2D barcode symbol pattern size having a specified percentage for a corresponding number of allowable individual data element errors for those individual data element(s) that are unreadable or missing and/or being additional. For the individual data element(s) errors within the 2D barcode symbol pattern to facilitate the recovery of the intended codeword(s). It is the error correction schemas that could facilitate having the actual individual codeword(s) data elements' having intentional erroneous variation(s) from the optimal 2D barcode symbol pattern for the intended codeword(s) that enable the correct pattern's codeword(s) decoding while having as much as 30% of the 2D barcode symbol pattern's individual code data elements' being erroneous depending on the selectable error correction schema utilized for the corresponding 2D barcode symbol pattern size.

The controlled deviation from the optimal 2D barcode symbol pattern image for a specific codeword(s) could be via the intentional addition of extra individual code data element(s), being similar to the "SALT" technique utilized to improve the safety for the storage of passwords by having additional non-critical random data being inter-mixed with the specific password characters to safeguard the critical password data by its obfuscation, and/or the intentional deletion/omission of selected individual code data element(s) within the optimal 2D barcode symbol pattern image. With both of these methods then utilizing the ECC-200 Reed-Solomon schema, or industry standard, or a proprietary equivalent, to determine the original 2D barcode symbol pattern's specific codeword(s) contained within the objective of the 2D barcode symbol pattern.

Alternatively having the individual data element(s) 3D data encoded data lands' in those additional and/or instructional code contained in the specific individual data elements' locations for decoding the obfuscated original 2D barcode's codeword(s) of the 2D symbol's pattern, that would be readable as an individual data element(s), locationally identifiable within the 2D symbol's pattern, verifiable, and subsequently utilized to facilitate the decoding and/or authentication of the original 2D barcode's codeword(s) contained within the displayed 2D barcode symbol pattern.

As these fore mentioned techniques can be utilized for the security of a publicly viewed and capturable 2D barcode's pattern codeword(s) image, thereby improving the counterfeiting/unauthorized usage resistance of the obfuscated original codeword(s) of the 2D barcode symbol pattern as its viewable 2D barcode symbol pattern's codeword(s) are either conventionally captured by the un-enabled public and being conventionally decoded as being unreadable/un-decodable or intentionally as having a different/misleading codeword(s), while having the confidential/sensitive/private obfuscated original codeword(s) data being not publicly displayed and/or associated and/or transmitted together.

2 Intentionally controlled unique variable(s) for having the initiated and/or responsive user selection of the predetermined individual data element location(s) of the 2D barcode symbol pattern;

The scanned 2D barcode pattern symbol image having the optimal 2D barcode symbol pattern containing the erroneous individual data elements for either an error correctable valid original codeword(s) and/or valid alternate erroneous/decoy codeword(s), either with or without having the unique 3D data element(s), being displayed for the user to select the missing and/or additional individual data elements to be omitted as required for the corresponding data error correction schema to correctly decode the valid original codeword(s). Having the user's selection of the individual data element(s) being subsequently utilized for the valid or invalid confirmation/authorization determination by the access control system as an initial input and/or a responsive acknowledgement of the original codeword(s) for the scanned visible 2D barcode pattern symbol.

3 Intentionally controlled unique variable(s) for the 2D barcode symbol pattern's intentionally hidden within the displayed 2D barcode symbol pattern via its pre-selected specific individual data elements required for the intended 2D barcode symbol pattern's code word(s) having those individual data elements being pre-selected by the secret encoding of those individual data elements being determined by the individual elements' 3D encoded land's data for being a pre-selected encoded data/code word that is known by the validation system and is then correctly selected by the user for their confirmed access or incorrectly selected by the user for their rejection.

4 Intentionally controlled and/or incidental random unique variables for the opaque and/or transparent plastic or equivalent applicable article's substrate's interaction of the 2D barcode symbol pattern's imaging characteristics of the individual 3D encoded lands' data element's unique stress-induced birefringence image pattern(s) and color(s) as digitally captured being illuminated via direct and/or back-field polarized and/or controlled color(s) lighting.

5 Intentionally controlled unique variables for having the individual 3D encoded lands' data element's rotational engraving tooling's leading cutting edge(s) or trailing marking edge(s), angular location(s), and leading and/or trailing edge(s) characteristics of the 2D barcode symbol pattern;

There can be one, or more, leading cutting or trailing marking edges having equidistant or variable rotational angular spacing's between the edges for the rotational engraving tooling with the edge(s) being inline or offset in either a positive or negative direction from the center axis of the 3D encoded lands' data element, having the edge geometry being either straight, curved positive arcing, curved negative arcing, curved consisting of a series of wavy arcs, having an angled face for the leading edge to engage the workpiece surface in a clockwise or counterclockwise rotational direction for being utilized by stopping the encoded stylus's tool's rotation at a specific stylus tool's rotational degree angular position relative to the workpiece/article before retracting from the workpiece's/article's surface as to be cutting into or marking the workpiece's/article's surface with the engraving stylus's leading edge(s) or rotating the engraving stylus while retracting the stylus from the workpiece surface as to not be cutting or marking into the workpiece's/article's surface with the engraving stylus's leading edge(s). Or being utilized in the opposite non-cutting directional rotation stopping the stylus's tool's rotation at a specific stylus tool rotational degree angular position before retracting from the workpiece's/article's surface as to mark an impression into the workpiece's/article's surface with the engraving stylus's trailing edge(s) or the non-cutting rotation of the engraving stylus while retracting the stylus from the workpiece's/article's surface as to not be marking an impression into the workpiece workpiece's/article's surface with the engraving stylus's trailing edge. Having these unique controlled cuttings and/or markings for encoding data via the markings' combinations and/or permutations for subsequently being utilized to improve the authentication integrity, counterfeiting resistance, and counterfeit detection of the 2D barcode's individual 3D engraved data element codeword(s) contained within the 2D barcode symbol pattern, utilizing the enhanced security of the individual 3D engraved data element codeword(s) to improve the authentication objective of the 2D barcode's codeword(s) contained within the 2D barcode symbol pattern, to improve the security of the 2D barcode's codeword(s) by improving the counterfeiting resistance and counterfeit detectability of the individual 3D encoded lands' data elements of the 2D barcode symbol pattern.

6 Intentionally controlled unique variable(s) for the 2D barcode's individual data elements' 3D encoded lands' circular, angular, and-or orthogonal motion path(s) of the engraving machine tool;

The encoded lands' data engraving stylus tooling's machine tool would utilize the interpolation of its multiple axes to follow uniquely measurable circular, angular, and-or orthogonal motion path(s) on the X & Y plane for creating a unique tooling path pattern for having its unique corresponding characteristics for its circular, angular, and-or orthogonal motion paths, as its having an oval, square, rectangle, triangle, polygon shape(s), that are imparted onto the surfaces of the individual 3D data element(s) of the 2D barcode pattern symbol for both the encoded engraving stylus's CW or CCW workpiece's/article's cutting and-or impression marking's as being determined by the styluses' edge(s) geometry and its directional rotation, or the rotational engraving spindle's C axis for its coordinated circular interpolation of the of the X and Y axes while the spindle's rotation is synchronized to rotationally orbit the encoded lands engraving stylus about the center axis of the individual data elements location to tangentially align the engraving flute with its central effective axis of rotation being the central axis or traversed about at its 3D encoded lands' individual data element's location.

Additionally, the stationary X & Y axes position for either an offset single flute or centered axis multiple flute(s) encoded land drill having its corresponding 3D data encoded cutting lands for engraving the individual element's data into the specific individual data element location of the 2D barcode pattern symbol via its stylus' rotation about its single center-line axis for having a more symmetrical, truer, concentric, and error-free circular path for cutting and-or marking its 3D encoded data lands.

Having the multiple combinations of the different engraving stylus and/or styluses' cutting tooling and/or cutting directional rotation and/or impression marking directional rotation to make each individual 3D engraved data element location(s) of the 2D barcode pattern symbol unique, measurable, and identifiable for encoding data and subsequently being utilized to improve the authentication integrity, counterfeiting resistance, and counterfeit detection of the 2D barcode's individual 3D engraved data element codeword(s) contained within the 2D barcode symbol pattern, utilizing the enhanced security of the individual 3D engraved data element codeword(s) to improve the authentication of the 2D barcode's objective codeword(s) contained within the 2D barcode symbol pattern via improving the security of the 2D barcode's codeword(s) by improving the counterfeiting resistance and counterfeit detectability of the individual 3D encoded lands' data elements of the 2D barcode symbol pattern.

7 Intentionally controlled unique variable(s) for having individual 3D encoded lands' data element's marking(s) across individual relative projection of the 3D encoded land(s) being marked at various angle(s) being done before and/or after the individual data elements' rotational engraving tooling has engraved the individual 3D encoded data elements' circular lands with the marking(s) being done by the individual data elements' rotational engraving tooling and/or a subsequent and/or preceding engraving operation for encoding data into the individual 3D encoded lands' data element(s) Having the radial markings of the encoded data land's bar and/or space detail being either-and/or being aligned to the center axis of the individual 3D encoded land's data character, being aligned to the other adjacent markings of that same unique marking, having different/spread out alignment angles to the other adjacent markings of that same unique marking;

8 Intentionally controlled variable(s) for having unique actual and/or effective diameter for the individual 3D encoded lands' data element's rotational engraving tool(s) either being the actual physical diameter or its effective depth's counter-sink step or counter-sink angled taper blend to the adjacent 2D barcode surface being facilitated by the industries' image decoding standard for 2D barcode symbol pattern's individual data element's character, being present or missing, is for its evaluation being the 80% circular area of the 2D barcode symbol patterns' individual data element's square area for that individual data element;

9 Intentionally controlled and incidental random unique variables for the absolute depths of the individual 3D data elements of the 2D barcode symbol pattern at specific location(s) via the different engraving tooling design specifications for the engraving point's angle, wear characteristics, setup measurement tolerance characteristics for installing the engraving tooling, while the engraving tooling is being supplied by different manufacturers, and utilizing different re-sharpening services;

10 Intentionally controlled and incidental random unique variables for the relative depths of the individual 3D encoded data elements' encoded data circular lands at specific location(s) via the different engraving tooling design specifications for the engraving point's angle, wear characteristics, setup measurement tolerance characteristics for installing the engraving tooling, while the engraving tooling is being supplied by different manufacturers, and utilizing different re-sharpening services;

11 Incidental random unique variables for the 2D barcode symbol pattern's individual 3D encoded data elements' encoded land(s) motion path characteristics of the engraving machine tool;

The encoded lands' data engraving stylus tooling's machine tool utilizing its positioning equipment's uniquely measurable circular interpolation path for at least two axes on the X & Y plane, for rotating the single encoded cutting edge flute' having its encoded 3D cutting lands engraving stylus being rotated about its central axis or traversed about at its 3D encoded lands' individual data element's location of the 2D barcode pattern symbol having a unique and measurable engraving path for its programmed path(s) random unique deviations that are imparted onto the surface(s) of the individual 3D data element of the 2D barcode pattern symbol for both the encoded engraving stylus's CW or CCW workpiece's/article's cutting and-or impression marking's as being determined by the styluses' edge(s) geometry and its directional rotation, or the rotational engraving spindle's C axis for its coordinated circular interpolation of the of the X and Y axes while the spindle's rotation is synchronized to rotationally orbit the encoded lands engraving stylus about the center axis of the individual data elements location to tangentially align the engraving flute with its central effective axis of rotation being the central axis or traversed about at its 3D encoded lands' individual data element's location.

The engraving styluses' or drill's cutting of the 3D encoded lands into the substrate having its corresponding 3D engraved cutting lands encoded data into the 2D barcode symbol pattern's data element location that will impart generally circular unique and traceable and measurable variable score marks, width of the lands and grooves, and depth of the lands and grooves that will correspond to the cutting edges' progressive wear pattern, manufacturing variations, and/or minor defect(s), that are always less than the intended circular encoding lands' variations for the encoded 3D data to prevent the misreading of the encoded 3D data. With the individual data elements' encoded data lands having a generally circular/orbiting path geometry while being similar in structural appearance to the helical markings on ballistic projectiles and utilizing analysis techniques being similar to the measurements of Rifling Impression's as used for legal metrology evidence for matching the unique helical surface bands and grooves of ballistic round(s) with the unique helical rifling and its wear pattern of the gun's barrel that fired the bullet/projectile for subsequently being utilized to improve the authentication integrity, counterfeiting resistance, and counterfeit detection of the 2D barcode's individual 3D encoded land's engraved data element codeword(s) contained within the 2D barcode symbol pattern. Thereby utilizing the enhanced security of the individual 3D engraved data element codeword(s) to improve the authentication objective of the 2D barcode's codeword(s) contained within the 2D barcode symbol pattern, to improve the security of the 2D barcode's codeword(s) by improving the counterfeiting resistance and counterfeit detectability of the individual 3D encoded lands' data elements of the 2D barcode symbol pattern.

12 Intentionally random unique variables for the in situ position(s) of the workpiece substrate surfaces' imperfections and voids within the individual 3D data element's character locations;

Utilizing the workpiece's/substrate's internal structure's randomly positioned imperfections and/or voids as having been exposed on the image/facing surfaces of the individual 3D encoded land's engraved data element by the engraving styluses', having the specific shapes of the imperfections and/or voids being identified with their location(s) being locationally identified and positionally mapped for subsequently being utilized to improve the authentication integrity, counterfeiting resistance, and counterfeit detection of the 2D barcode's individual 3D engraved data element codeword(s) contained within the 2D barcode symbol pattern, utilizing the enhanced security of the individual 3D engraved data element codeword(s) to improve the authentication objective of the 2D barcode's codeword(s) contained within the 2D barcode symbol pattern, to improve the security of the 2D barcode's codeword(s) by improving the counterfeiting resistance and counterfeit detectability of the individual 3D encoded land's engraved data element of the 2D barcode symbol pattern.

13 Intentionally controlled and incidental random unique variable(s) for the pre-positioned imbedded contrasting color(s) "tag(s)" within the substrate's individual 3D Data Elements locations;

Utilizing the workpiece's internally layered and/or randomly imbedded "tags(s)" having contrasting colors being exposed on the surfaces of the individual 3D encoded land's engraved data element by the engraving styluses', having their specific colors being identified with their location(s) being identified and positionally mapped for subsequently being utilized to improve the authentication integrity, counterfeiting resistance, and counterfeit detection of the 2D barcode's individual 3D engraved data element codeword(s) contained within the 2D barcode symbol pattern, utilizing the enhanced security of the individual 3D encoded land's engraved data element codeword(s) to improve the authentication objective of the 2D barcode's codeword(s) contained within the 2D barcode symbol pattern, to improve the security of the 2D barcode's codeword(s) by improving the counterfeiting resistance and counterfeit detectability of the individual 3D encoded lands' data elements of the 2D barcode symbol pattern.

14 Intentionally controlled and incidental random unique variable(s) for the dimensional accuracy of the engraving equipment, its operating environment, and its operational utilization sequencing for the engraving operations via utilizing intentionally and/or randomly variable engraving tooling positioning equipment and/or different engraving tooling and/or multiple engraving tooling and/or substrate pre-positioning equipment and/or drill means and/or variable workpiece/engraving tooling positioning axes equipment having unique relative alignment(s) and/or unique relative offset(s);

15 Intentionally controlled and incidental random unique variable(s) for the dimensional accuracy of the engraving cutting and imprinting tooling, it's operating wear characteristics, and its utilization for sequencing the engraving operations via utilizing intentional and/or randomly variable engraving tooling usage/tool lives before their complete or partial setup replacement(s) and/or different engraving tooling suppliers and/or multiple engraving tooling and/or drill means pre-positioning equipment and/or variable engraving tooling re-sharpening equipment having unique relative alignment(s) and/or relative offset(s);

The 2D Barcode's individual data elements having imbedded data can incorporate additional controlled variable data utilizing multiple features having physical superpositions and entanglements for their quantifiable details thereby increasing the 2D barcode's data density, tamper resistance, error correction, and its security. While utilizing these techniques for 2D printed barcode's via the contrasting and/or color media of the conventionally "flat", 3D Planar debossed, or 3D Encoded 2D barcodes being done with or without the pre-printing and/or post-printing media to facilitate incorporating their additional controlled variable and or incidental random data utilizing multiple features having physical superpositions and entanglements for their details thereby increasing the 2D barcode's data density, tamper resistance, error correction, and its security.

The "flat", 3D, or planar debossed barcodes' can utilize the intentional and/or incidental random multiple features having their associated physical superpositions and entanglements for their quantifiable details being interpreted as data thereby increasing the barcode's tamper resistance and authentication security. While the securely controlled manufactured 3D encoded data lands of the 2D barcode can facilitate additional security for the user/point-of-use mobile reader via the manufacturers' confirmation of the authenticity of the barcode by utilizing a smartphone's depth sensing camera(s), or equivalents, as is routinely used to distinguish from a 2D printed picture versus an actual person's face for the smartphone user's authentication.

A method and apparatus for encoding unique encoded lands and 3D markings variable data for the individual data elements of a 2D barcode on a work piece having the 3D data consisting of multiple details' physical superpositions that are entangled to where the individual 3D data elements are immutable in that they are not easily or economically replicated via the controlled intentional variable data and random incidental characteristics' having multiple physical superpositions and entanglements. This method includes engraving a plurality of first features (e.g., circular features) on the work piece, wherein the plurality of first features are arranged in a first pattern. This method also includes engraving a plurality of second features (e.g., 3D data elements) on the work piece within a selected one of the plurality of first features. The plurality of second features are arranged in a second pattern according to a data encoding schema such as binary code or code 39 or Interleaved 2 of 5 or other industry standard or proprietary barcode data format for optionally incorporating their corresponding codes' stop and/or start data control features' elements. This method also includes engraving a plurality of third features (e.g., 3D data elements) on the work piece within a selected one of the pluralities of second features. This method also includes having a subsequent method and apparatus for capturing, analyzing, secure data storage and retrieval for determining the authenticity of the work piece's identification.

This application is related to U.S. Pat. No. 9,931,681, filed Oct. 5, 2015, titled "MULTI-STYLUS ORBITAL ENGRAVING TOOL;" U.S. Pat. No. 10,335,842, filed Oct. 5, 2015, titled "METHOD AND APPARATUS FOR ENCODING DATA ON A WORK PIECE;" U.S. Pat. No. 9,573,181, filed Oct. 5, 2015, titled "SPINDLE MOUNTABLE CAMERA SYSTEM;" U.S. Pat. No. 9,930,230, filed Feb. 17, 2017, titled "HARSH ENVIRONMENT VISION CAMERA SYSTEM;" U.S. Pat. No. 10,618,093, filed Mar. 1, 2018, titled "MULTI-STYLUS ORBITAL ENGRAVING TOOL;" U.S. patent application Ser. No. 15/919,624, filed Mar. 13, 2018, titled "HARSH ENVIRONMENT ENCLOSURE;" U.S. Pat. No. 10,702,903, filed Jun. 17, 2019, titled "METHOD AND APPARATUS FOR ENCODING DATA ON A WORK PIECE;" and U.S. Pat. No. 10,095,091, filed Apr. 6, 2017, titled "CONTROLLED CAMERA OFF-AXIS ALIGNMENT FOR THE DYNAMIC BORE-SURFACE-STRUCTURE INSPECTIONS VIA ROTATIONAL/ORBITAL/ROTATIONAL ORBITING ANGULAR OFF-AXIS CONTROLLED VISION CAMERA SYSTEMS AND THEIR CORRESPONDING OPTICAL POSITIONAL/ANGULAR ALIGNMENT DATUM'S," all of which are incorporated herein by reference in their entireties.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for authenticating an article, the method comprising:
    forming a circular feature into an acrylic verification substrate including at least one ring within the circular feature in the form of a data encoding schema, wherein the data encoding schema is a circular barcode and the at least one ring includes a surface anomaly;
    capturing a first image of the circular feature and storing the first image in a memory device;
    attaching the verification substrate to the article;
    capturing a second image of the circular feature; and
    comparing the second image with the first image to determine if the surface anomaly is present in the second image, thereby authenticating the article.

2. The method of claim 1, wherein the circular feature comprises a plurality of concentric rings within the circular feature arranged in a pattern according to the data encoding schema.

3. The method of claim 1, wherein the circular feature is concave.

4. The method of claim 1, wherein the data encoding schema is I2of5.

5. The method of claim 1, further comprising forming at least one radial feature into the at least one ring.

6. A method for authenticating an article, the method comprising:
    forming a circular feature into an acrylic verification substrate including at least one ring within the circular feature in the form of a data encoding schema, wherein the data encoding schema is a circular barcode and the at least one ring includes a surface anomaly;
    capturing a first image of the circular feature and storing the first image in a memory device;
    printing a barcode on the verification substrate;
    associating the barcode with the first image in the memory device;
    attaching the verification substrate to the article;
    capturing a second image of the circular feature; and
    comparing the second image with the first image to determine if the surface anomaly is present in the second image, thereby authenticating the article.

7. The method of claim 6, wherein the circular feature comprises a plurality of concentric rings within the circular feature arranged in a pattern according to the data encoding schema.

8. The method of claim 6, wherein the circular feature is concave.

9. The method of claim 6, wherein the data encoding schema is I2of5.

10. The method of claim 6, further comprising engraving at least one radial feature into the at least one ring.

11. The method of claim 6, wherein the barcode is a quick response code and the circular feature is a pattern locator for the barcode.

12. A system for authenticating an article, comprising:
    a verification substrate, including:
        a circular feature including at least one ring within the circular feature in the form of a data encoding schema, wherein the data encoding schema is a circular barcode and the at least one ring includes a surface anomaly; and
        an adhesive disposed on the verification substrate for attaching the verification substrate to an article;
    a camera configured to capture a first image of the circular feature;
    a database for receiving and storing the first image and associating a barcode printed on the substrate with the first image;
    a processor programed to receive a second image of the circular feature and compare the second image with the first image to determine if the surface anomaly is present in the second image, thereby authenticating the article.

13. The system of claim 12, wherein the circular feature comprises a plurality of concentric rings within the circular feature arranged in a pattern according to the data encoding schema.

14. The system of claim 13, further comprising engraving at least one radial feature into a corresponding one of the plurality of rings.

15. The system of claim 14, wherein the circular feature is concave.

16. The system of claim 12, wherein the data encoding schema is I2of5.

17. The system of claim 12, wherein the substrate comprises acrylic.

18. The system of claim 12, wherein the barcode is a quick response code and the circular feature is a pattern locator for the barcode.

* * * * *